(12) United States Patent
Huang

(10) Patent No.: US 10,038,973 B2
(45) Date of Patent: Jul. 31, 2018

(54) METHOD AND SYSTEM FOR DETERMINING A POSITIONING INTERVAL OF A MOBILE TERMINAL

(71) Applicant: Alibaba Group Holding Limited, Grand Cayman (KY)

(72) Inventor: Jianfei Huang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/164,337

(22) Filed: May 25, 2016

(65) Prior Publication Data

US 2016/0366552 A1 Dec. 15, 2016

(30) Foreign Application Priority Data

Jun. 10, 2015 (CN) .......................... 2015 1 0316913

(51) Int. Cl.
*H04W 4/02* (2018.01)
*H04W 4/021* (2018.01)
(52) U.S. Cl.
CPC ........... *H04W 4/021* (2013.01); *H04W 4/023* (2013.01)
(58) Field of Classification Search
CPC .............................. H04W 4/021; H04W 4/023
See application file for complete search history.

(56) References Cited

U.S. PATENT DOCUMENTS

| | | | |
|---|---|---|---|
| 8,019,532 B2 | 9/2011 | Sheha et al. | |
| 8,396,485 B2 | 3/2013 | Grainger et al. | |
| 8,686,852 B2 | 4/2014 | Ben-Dayan et al. | |
| 8,766,791 B2 | 7/2014 | Koen et al. | |
| 8,868,104 B2 | 10/2014 | Grainger et al. | |
| 9,049,555 B2 | 6/2015 | Wang et al. | |
| 9,060,248 B1 | 6/2015 | Coulombe et al. | |

(Continued)

FOREIGN PATENT DOCUMENTS

| | | |
|---|---|---|
| EP | 2744234 A1 | 6/2014 |
| WO | 2014206627 A1 | 12/2014 |

OTHER PUBLICATIONS

Nakagawa, T. et al., "Variable interval positioning method for smartphone-based power-saving geofencing, Personal Indoor and Mobile Radio Communications (PIMRC)", 2013 IEEE 24th International Symposium on, Nov. 25, 2013.

(Continued)

*Primary Examiner* — Liton Miah
(74) *Attorney, Agent, or Firm* — James J. DeCarlo; Greenberg Traurig, LLP

(57) ABSTRACT

The disclosure relates to a method and system for determining a positioning interval of a mobile terminal. The method and system include the mobile terminal acquiring current location information, and sending the location information to the server; the mobile terminal receiving, from the server, a distance between the current location of the mobile terminal and a designated geo-fence; the mobile terminal obtaining current motion information; the mobile terminal acquiring, from the server, an active time of a user associated with the mobile terminal; and the mobile terminal determining time interval information on a next positioning according to the received distance, motion information and whether or not the current time is within the active time of the user.

15 Claims, 29 Drawing Sheets

(56) References Cited

U.S. PATENT DOCUMENTS

| | | | |
|---|---|---|---|
| 9,119,038 B2 | 8/2015 | Woods et al. | |
| 9,215,560 B1 | 12/2015 | Jernigan | |
| 2010/0081456 A1* | 4/2010 | Singh | G06Q 10/109 |
| | | | 455/456.1 |
| 2010/0214092 A1* | 8/2010 | Mauro | G08B 25/10 |
| | | | 340/539.1 |
| 2010/0291950 A1* | 11/2010 | Lin | H04W 4/029 |
| | | | 455/456.3 |
| 2012/0177010 A1 | 7/2012 | Huang et al. | |
| 2014/0101082 A1 | 4/2014 | Matsuoka et al. | |
| 2014/0179344 A1 | 6/2014 | Bansal et al. | |
| 2014/0330737 A1* | 11/2014 | Williams | G06Q 10/0833 |
| | | | 705/333 |
| 2014/0351411 A1 | 11/2014 | Woods et al. | |
| 2015/0031388 A1 | 1/2015 | Chatterjee et al. | |
| 2015/0141045 A1 | 5/2015 | Qiu | |
| 2015/0142489 A1* | 5/2015 | Block | G06Q 10/06311 |
| | | | 705/7.13 |
| 2015/0199610 A1* | 7/2015 | Hershberg | H04W 4/70 |
| | | | 706/12 |
| 2015/0281886 A1 | 10/2015 | Steiner | |
| 2016/0029166 A1 | 1/2016 | Meredith et al. | |

OTHER PUBLICATIONS

International Search Report and Written Opinion to corresponding International Application No. PCT/US2016/034284 dated Aug. 31, 2016.

* cited by examiner

METHOD AND SYSTEM FOR DETERMINING A POSITIONING INTERVAL OF A MOBILE TERMINAL

CROSS REFERENCE TO RELATED APPLICATIONS

This application claims the benefit of priority of Chinese Application No. 201510316913.9, titled "Method of Determination of Positioning Interval of Mobile Terminal, Mobile Terminal and Server Thereof", filed on Jun. 10, 2015, which is hereby incorporated by reference in its entirety.

TECHNICAL FIELD

The present disclosure relates to the field of location-based services, and more particularly, to a system and method for determining a positioning interval of a mobile terminal.

BACKGROUND

With the development of mobile communications technologies and the popularization of computer technologies, location-based service (LBS) technology enters into people's daily lives. By using the LBS technology, the location of a mobile terminal may be acquired by positioning the mobile terminal, and then location-dependent services are provided for the mobile terminal. For example, by using the LBS technology, the location of the mobile terminal may be acquired by means of a positioning device such as a GPS, and, within a certain distance range nearby, the mobile terminal may search and/or select a location, names and addresses of a nearby building or storefront, such as a hotel, a cinema, a mall, a gas station or the like.

In recent years, with the rapid development of the LBS technology, new applications based on the LBS technology have been developed. One of these applications is geo-fencing technology. In the geo-fencing technology, a geo-fence may be formed by a virtual fence. When the mobile terminal enters into or leaves the geo-fence, or acts within the geo-fence, a notification or a prompt corresponding to the geo-fence may be received. As another example, in a location-based social network, the geo-fencing technology may be used for assisting a user in automatic registration when the user enters into a certain region.

With some existing techniques, to execute the foregoing applications with geo-fencing, the mobile terminal needs to determine a location positioning according to a preset positioning interval, and then it is determined whether the mobile terminal enters into a certain geo-fence.

With these existing techniques, the positioning interval of a mobile terminal is preset, which is typically an empirical value. In order to ensure a recognition rate of a geo-fence, the positioning interval cannot be preset too large, otherwise, it may result in the mobile terminal consuming too much power and network data flow. In addition, when the mobile terminal gets closer to the geo-fence, the preset positioning interval may also determine that it is unable to timely and accurately recognize the geo-fence, thus the recognition rate of the geo-fence is reduced.

SUMMARY

An embodiment of the present disclosure provides a system and method for determining a positioning interval of a mobile terminal to solve the existing problems that mobile terminal positioning has regarding consuming too much power and network data flow and that geo-fencing has a low recognition rate.

In one aspect, a method for determining a positioning interval of a mobile terminal includes the mobile terminal acquiring current location information thereof, and sending the location information to a server; the mobile terminal receiving, from the server, a distance between the current location of the mobile terminal and a designated geo-fence; and the mobile terminal determining time interval information on a next positioning according to the received distance.

In one embodiment, the mobile terminal obtains current motion information and determines time interval information on a next positioning according to the received distance and the motion information.

In one embodiment, the mobile terminal acquires, from the server, an active time of a user associated with the mobile terminal; and determines time interval information on a next positioning according to the received distance and whether or not the current time is within the active time of the user. In one embodiment, the mobile terminal determines time interval information on a next positioning according to the received distance, the motion information and whether or not the current time is within the active time of the user.

In one embodiment, the mobile terminal calculates a distance between the current location and a designated geo-fence and determines time interval information on a next positioning according to the distance obtained by calculation. In one embodiment, the mobile terminal determines time interval information on a next positioning according to the distance obtained by calculation and the motion information.

In one embodiment, the mobile terminal acquires, from the server, an active time of a user associated with the mobile terminal; and the mobile terminal determines time interval information on a next positioning according to the distance obtained by calculation and whether or not the current time is within the active time of the user. In one embodiment, the server acquires current location information of a mobile terminal and calculates a distance between the current location of the mobile terminal and a designated geo-fence. The server can then determine time interval information on a next positioning of the mobile terminal according to the distance obtained by calculation; and the server sends the determined time interval information on a next positioning to the mobile terminal.

In one embodiment, the server receives current motion information uploaded by the mobile terminal, determines time interval information on a next positioning of the mobile terminal according to the distance obtained by calculation and the motion information; and sends the determined time interval information on a next positioning to the mobile terminal.

In one aspect, a mobile terminal for determining a positioning interval of the mobile terminal includes a positioning module, configured to acquire current location information of a mobile terminal, and send the location information to a server; a receiving module, configured to receive, from the server, a distance between the current location of the mobile terminal and a designated geo-fence; and a processing module, configured to determine time interval information on a next positioning according to the received distance.

In one embodiment, the mobile terminal includes a motion sensing module, configured to obtain current motion information of the mobile terminal; and a processing module, configured to determine time interval information on a next positioning according to the received distance and the motion information.

In one embodiment, the mobile terminal also includes a querying module, configured to acquire, from the server, active time of a user associated with the mobile terminal; and a processing module, configured to determine time interval information on a next positioning according to the received distance and whether or not the current time is within the active time of the user.

In one embodiment, the processing module is configured to determine time interval information on a next positioning according to the distance obtained by calculation and the motion information.

Embodiments of the present disclosure provide a system and method for determining a positioning interval of a mobile terminal. The method includes acquiring location information of the mobile terminal, sending the location information to the server, and then receiving, from the server, a distance between the current location of the mobile terminal and a designated geo-fence; simultaneously obtaining current motion information of the mobile terminal, and acquiring, from the server, active time of a user associated with the mobile terminal; and determining time interval information on a next positioning of the mobile terminal according to the received distance, the motion information and whether or not the current time is within the active time of the user. In this way, real-time adjustment of the positioning interval of the mobile terminal is implemented, power and network data flow consumed in mobile terminal positioning are reduced, and the recognition rate of geo-fencing is improved.

BRIEF DESCRIPTION OF THE DRAWINGS

In the drawing figures, which are not to scale, and where like reference numerals indicate like elements throughout the several views.

DETAILED DESCRIPTION OF THE EMBODIMENTS

Figure 1:
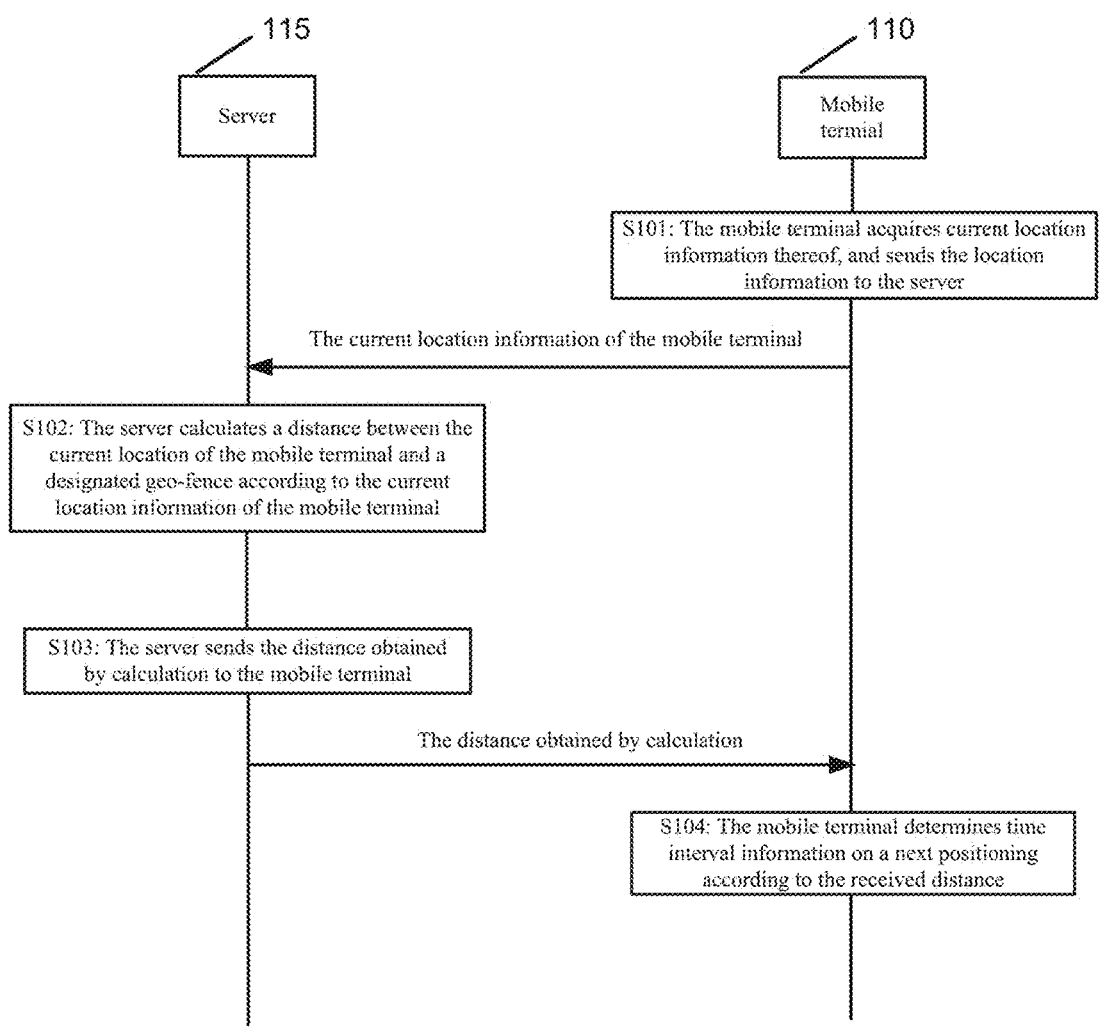
FIG. 1 is a flowchart of a method for determining a positioning interval of a mobile terminal according to an embodiment of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered subject matter is intended to be construed as not being limited to any example embodiments set forth herein; example embodiments are provided merely to be illustrative. Likewise, a reasonably broad scope for covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the disclosure, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

A computing device may operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client device (or mobile terminal) may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Disclosed subject matter is intended to cover a wide range of potential variations. For example, a simple smart phone, phablet or tablet may include a numeric keypad or a display. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

FIG. 1 is an embodiment of the method for determining a positioning interval of a mobile terminal 110 provided by the present disclosure. In one embodiment, the method includes the following step:

S101: the mobile terminal 110 acquires current location information thereof, and sends the location information to a server 115.

The mobile terminal 110 may directly acquire the current location information via, for example, a built-in global positioning system (GPS); or acquire the location information after obtaining the current location information of the mobile terminal 110 based on calculation of the distance between the mobile terminal 110 and a base station of mobile operation networks; or determine and acquire the current location information in combination of the foregoing two positioning manners.

In one embodiment, a specific form of location information may be, for example, longitude and latitude. In another embodiment, the location information may also be a geographical location code transformed, by the mobile terminal 110, from the current longitude and latitude. For example, the mobile terminal 110 may transform the current longitude and latitude into a geohash code by means of the geohash algorithm.

In the following, by taking the geohash algorithm as an example, when the mobile terminal 110 transforms, in one embodiment, the current location information into a geographical location code:

It is supposed that in the current location information of the mobile terminal 110, the latitude is, e.g., 39.928167, and the longitude is, e.g., 116.389550. An approximation coding is conducted on the latitude 39.928167 of the location information via the following exemplary procedures:

1) A terrestrial latitude interval [−90, 90] is dimidiated into two left and right intervals: [−90, 0] and [0, 90].

Two intervals divided from one interval are respectively referred to as a left interval and a right interval. The left interval is an interval where smaller numerical values are, and the right interval is an interval where larger numerical values are. Further, latitudes are marked by using the following rules:

A latitude within the right interval is marked as 1; and a latitude within the left interval is marked as 0. So the latitude 39.928167 falls within the right interval [0, 90], and is marked as 1 according to the aforementioned exemplary rules.

2) The right interval [0, 90] where the latitude 39.928167 is within is dimidiated into two left and right intervals: [0, 45] and [45, 90]. It is determined that the latitude 39.928167 falls within the left interval [0, 45], and is marked as 0.

3) The process of the foregoing Step 1) and Step 2) is recursed according to the following Table 1 until a predetermined digit is marked.

According to the foregoing rules, the latitude 39.928167 is marked as 1 if it falls within the right interval of a dimidiated interval, and is marked as 0 if it falls within the left interval.

Each time as an iterative interval is narrowed down, a mid-value (a Mid-value in Table 1) of an interval gets increasingly closer to 39.928167.

After the interval is dimidiated a certain number of times, the relation between a latitude value and the interval dimidiated is determined and the latitude value is marked. In this way, a serial number consisting of 0 and 1 may be obtained, and the length of the serial number is related to the number of times of dimidiation. Table 1 lists out an embodiment of an interval iteration table of the latitude 39.928167.

TABLE 1

Interval Iteration Table of the Latitude 39.928167

| Bit | Min | Mid | Max |
|---|---|---|---|
| 1 | −90.000 | 0.000 | 90.000 |
| 0 | 0.000 | 45.000 | 90.000 |
| 1 | 0.000 | 22.500 | 45.000 |
| 1 | 22.500 | 33.750 | 45.000 |
| 1 | 33.750 | 39.375 | 45.000 |
| 0 | 39.375 | 42.188 | 45.000 |

TABLE 1-continued

Interval Iteration Table of the Latitude 39.928167

| Bit | Min | Mid | Max |
|---|---|---|---|
| 0 | 39.375 | 40.7815 | 42.188 |
| 0 | 39.375 | 40.07825 | 40.7815 |
| 1 | 39.375 | 39.726625 | 40.07825 |
| 1 | 39.726625 | 39.9024375 | 40.07825 |

As shown in Table 1, after ten interval iterations, a serial number 10111 00011 corresponding to the latitude 39.928167 may be obtained (marked numerical values are arrayed from left to right in sequence), and the latitude interval narrowed down to be [39.9024375, 40.07825].

By using the same method, after ten interval iterations, a serial number 11010 01011 corresponding to the longitude 116.389550 may be obtained, and the longitude interval narrowed down to be [116.3671875, 116.71875 ].

Further, a serial number corresponding to longitude and latitude may be coded to generate a geohash value corresponding to the longitude and latitude. A coding method is as below: serial numbers corresponding to the longitude and the latitude are successively and mutually interpolated to generate anew serial number. The first digit of the newly-generated serial number is the first digit of the serial number corresponding to the longitude. In one embodiment, in the case where the serial number corresponding to the latitude is 10111 00011 and the serial number corresponding to the longitude is 11010 01011, the first digit of the serial number corresponding to the longitude is used as the first digit of the newly-generated serial number, serial numbers corresponding to the longitude and the latitude are successively and mutually interpolated to generate such a new serial number as 11100 11101 00100 01111. Among the newly-generated serial number, in order from left to right, odd digits are serial numbers corresponding to longitudes, and even digits are serial numbers corresponding to latitudes. Further, 32 characters 0-9 and b-z (exclusive of a, i, l and o) may be used to conduct a base32 coding on the newly-generated serial number. The corresponding exemplary relation between the 32 characters 0-9 and b-z and decimal digits is as shown in Table 2.

TABLE 2

Corresponding Relation between decimal digits and Base32 Codes

| DEC | | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| B32 | 0 | 1 | 2 | 3 | 4 | 5 | 6 | 7 | 8 | 9 | b | c | d | e | F | g |
| DEC | | | | | | | | | | | | | | | | |
| | 16 | 17 | 18 | 19 | 20 | 21 | 22 | 23 | 24 | 25 | 26 | 27 | 28 | 29 | 30 | 31 |
| B32 | H | J | k | m | n | p | q | r | s | t | u | v | w | x | Y | z |

Note:
Dec represents Decimal signifying a decimal digit; and B32 represents a Base32 code.

In one embodiment, when the new serial number is coded, in the new serial number 11100 11101 00100 01111, every five digits may be first converted to decimal digits, namely corresponding to 28, 29, 4 and 15; and then the four decimal digits are coded by using the corresponding relation in Table 2. 28 is corresponding to w, 29 is corresponding to x, 4 is corresponding to 4, and 15 is corresponding to g, in this way, wx4g is obtained. wx4g is regarded as the geohash value of longitude and latitude (39.928167, 116.389550).

In the foregoing process of calculating the geohash code, iterations determine the length of the generated serial number, thereby determining the length of the finally generated geohash code. The longer the geohash code is, the more the iterations are, and the more approximate the final interval is to the actual longitude and latitude. In other words, the more the digits of the geohash code are, the more precise the corresponding relation with longitude and latitude is.

An embodiment of the next step in the method is:

S102: the server 115 calculates a distance between the current location of the mobile terminal 110 and a designated geo-fence according to the current location information of the mobile terminal 110.

In one embodiment, the server 115 queries a geo-fence closest to the current location of the mobile terminal 110 and calculates the distance between the mobile terminal 110 and the closest geo-fence according to a corresponding relation between predefined geographical location information and a geo-fence.

In a background process, the server 115 may be provided with multiple geo-fences according to different standards, and, for example, a corresponding relation between longitude and latitude and the geo-fences is pre-established. The server 115 may query whether the geographical location information around the mobile terminal 110 intersects a certain geo-fence. If so, the geo-fence closest to the current location of the mobile terminal 110 is regarded as the designated geo-fence, and the distance between the mobile terminal 110 and the closest geo-fence is regarded as the distance between the current location of the mobile terminal 110 and the designated geo-fence.

In another embodiment, the server 115 queries the closest geo-fence within a query region corresponding to the current location of the mobile terminal 110 and calculates the distance between the mobile terminal 110 and the closest geo-fence within the query region according to the corresponding relation between the predefined geographical location information and the geo-fence.

By analyzing large amounts of data, the server 115 may determine some regions where the mobile terminal 110 is located. For example, by means of an analysis of large amounts of data, the server 115 may learn that a user who is an office worker is often located around a region A 2 km around a company and a region B 3 km around a home. After the location information of the mobile terminal 110 is received by the server 115, if it is determined that the current location of the mobile terminal 110 is within the region A, this suggests that the corresponding user may be at work at the moment, and the mobile terminal 110 more than likely enters into the geo-fence of the region A. At the moment, by taking the region A as a query region of the geo-fence, it is possible to avoid interference of geo-fences of regions where the user incorrectly enters with the query process, and thus the quantity of data needing to be queried is reduced.

In another embodiment, the corresponding relation between the predefined geographical location information in the server 115 and the geo-fence may also be the corresponding relation between the geographical location code and the geo-fence. The server 115 converts the geographical location information to the geographical location code, and establishes the corresponding relation between the geographical location code and the geo-fence. In this way, the quantity of calculation of the distance between the designated geo-fence and the mobile terminal 110 is simplified, and the stress of the server is relieved.

In one embodiment, the corresponding relation between the geographical location code and the geo-fence may be an inverted index of geo-fences searched according to the geohash code.

Figure 2:
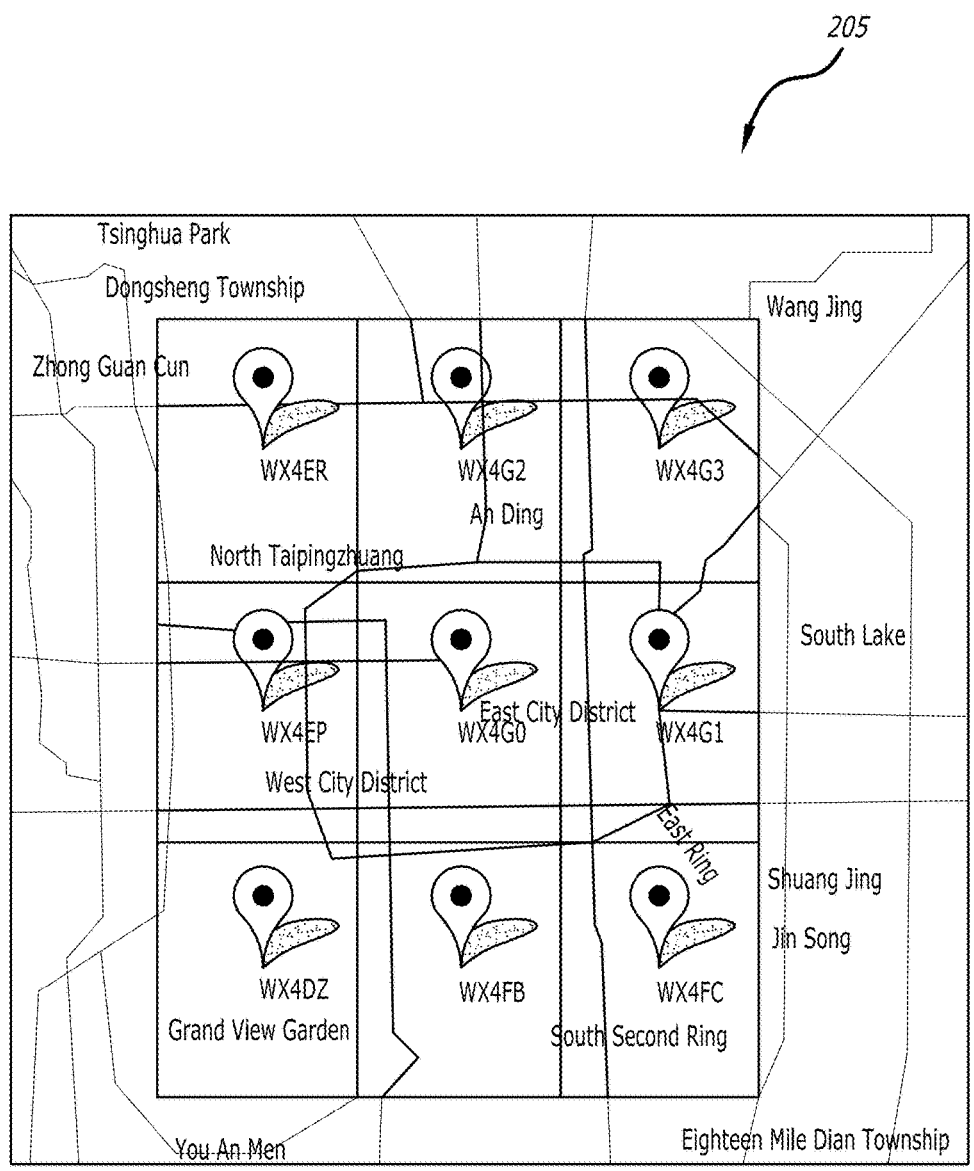
FIG. 2 is a schematic diagram of a geographical location divided according to a geohash value provided by an embodiment of the present disclosure.

Also referring to FIG. 2, for example, the geographical location code converted from the current location information of the mobile terminal 110 by using the geohash algorithm is WX4G0. According to the geohash code rules, it is learned that the peripheral region of WX4G0 has eight geographical location codes 205, namely: WX4ER, WX4G2, WX4G3, WX4G1, WX4FC, WX4FB, WX4DZ and WX4EP. The mobile terminal 110 queries whether the eight geographical location codes intersect with a certain geo-fence in a fence query region corresponding to the server 115. If so, the intersected geo-fence is deemed to be the closest to the mobile terminal 110. Of course, if none of the eight geographical location codes intersects the geo-fence, it is further searched whether peripheral geographical location codes intersect the geo-fence, until a geographical location code that intersects the geo-fence is determined.

In one embodiment, additional steps in the method include:

S103: the server sends the distance obtained by calculation to the mobile terminal 110.

S104: the mobile terminal 110 determines time interval information on a next positioning according to the received distance.

In this step, the next positioning time interval determined by the mobile terminal 110 is positively associated with the distance between the mobile terminal 110 and the designated geo-fence.

The distance between the mobile terminal 110 and the designated geo-fence may reflect, to a certain extent, the possibility of the mobile terminal 110 entering into the geo-fence in the future. The closer the mobile terminal 110 is to the designated geo-fence, the higher likelihood that the mobile terminal 110 will enter into the geo-fence. Therefore, the closer the mobile terminal 110 is to the designated geo-fence, the smaller the time interval of a next positioning determined by the mobile terminal 110 is. Therefore, the farther the mobile terminal 110 is to the designated geofence, the larger the time interval of the next positioning determined by the mobile terminal 110 is.

In one embodiment, after the mobile terminal 110 determines the time interval information on the next positioning, a process of obtaining the location information may be paused. After the determined time interval, the mobile terminal 110 may reacquire the current location information, and the server 115 may calculate a distance between the mobile terminal 110 and a designated geo-fence according to the reacquired location information. In this way, the mobile terminal 110 may determine the time interval information on the next positioning according to the distance obtained by recalculation.

Figure 3:
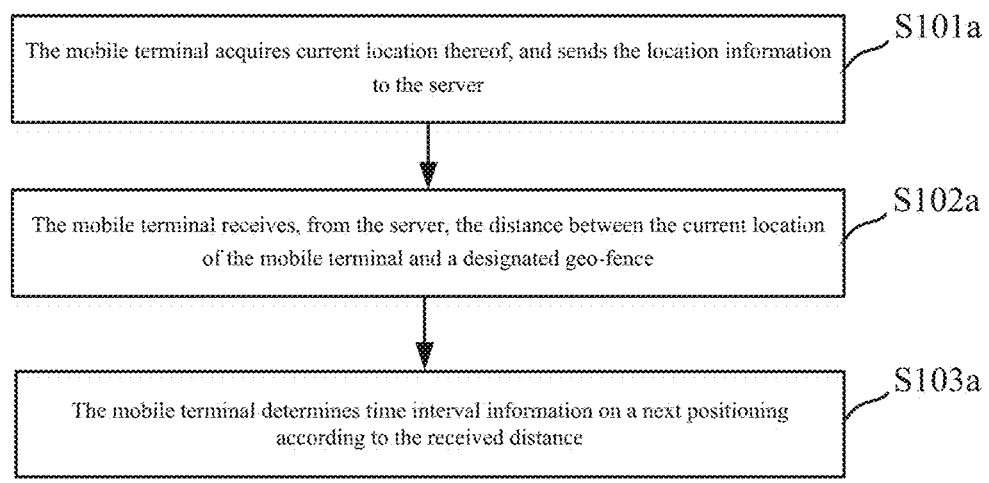
FIG. 3 is a flowchart of a method for determining a positioning interval of a mobile terminal, from the mobile terminal's perspective, according to an embodiment of the present disclosure.

FIG. 3 is an embodiment of the method for determining a positioning interval of a mobile terminal provided by the present disclosure. Specifically, the following steps, in one embodiment, are included:

S101a: the mobile terminal acquires current location information, and sends the location information to the server.

S102a: the mobile terminal receives, from the server, the distance between the current location of the mobile terminal and a designated geo-fence.

In one embodiment, Step S102a includes the mobile terminal receiving, from the server, a distance between the mobile terminal and a geo-fence closest to the current location; or the mobile terminal receiving, from the server, the distance between the mobile terminal and the geo-fence closest to the current location within a query region corresponding to location information of the mobile terminal.

S103a: the mobile terminal determines time interval information on a next positioning according to the received distance.

In this step, the next positioning time interval determined by the mobile terminal is positively associated with the distance between the mobile terminal and the designated geo-fence.

Figure 4:
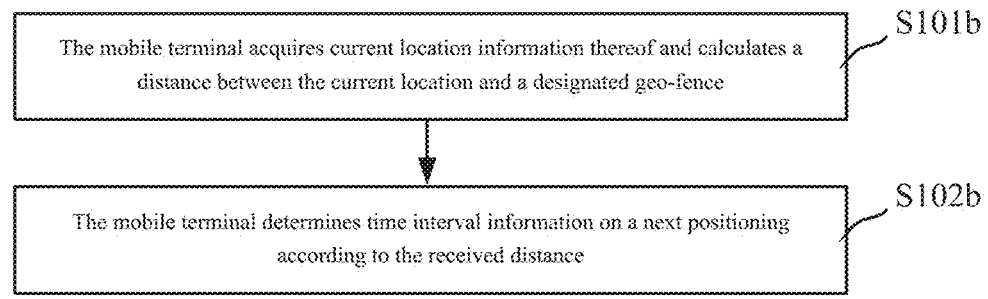
FIG. 4 is a flowchart of a method for determining a positioning interval of a mobile terminal, from the mobile terminal's perspective, according to another embodiment of the present disclosure.

FIG. 4 is an embodiment of the method for determining a positioning interval of a mobile terminal provided by the present disclosure. In one embodiment, the following steps are included:

S101b: the mobile terminal acquires current location information and calculates a distance between the current location and a designated geo-fence.

In one embodiment, Step S101b includes the mobile terminal querying a geo-fence closest to the current location of the mobile terminal and calculating the distance between the mobile terminal and the closest geo-fence according to a corresponding relation between predefined geographical location information and a geo-fence; or the mobile terminal querying a closest geo-fence within a query region corresponding to the current location of the mobile terminal and calculates the distance between the mobile terminal and the closest geo-fence within the query region according to the corresponding relation between the predefined geographical location information and a geo-fence.

S102b: the mobile terminal determines time interval information on a next positioning according to the received distance.

In this step, the next positioning time interval determined by the mobile terminal is positively associated with the distance between the mobile terminal and the designated geo-fence.

Figure 5:
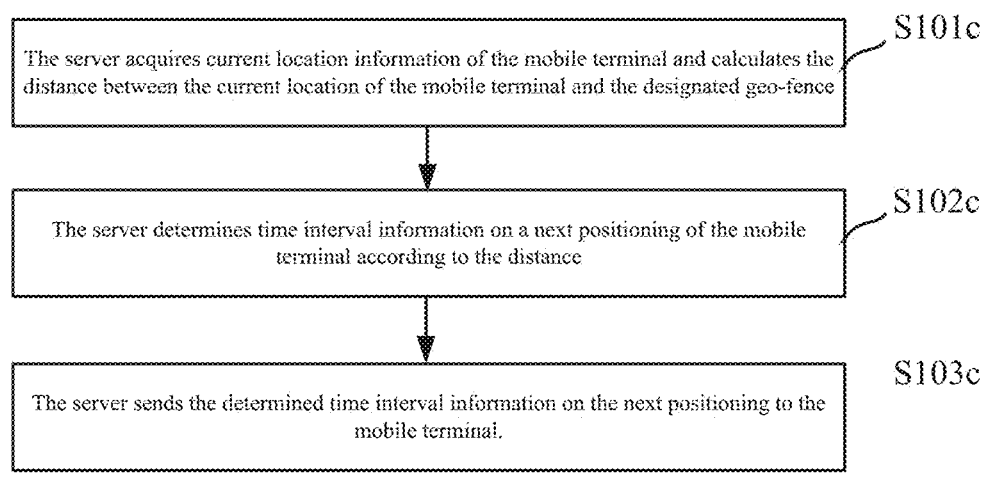
FIG. 5 is a flowchart of a method for determining a positioning interval of a mobile terminal, from the server's perspective, according to an embodiment of the present disclosure.

FIG. 5 is an embodiment of the method for determining a positioning interval of a mobile terminal, from the server's perspective, provided by the present disclosure. Specifically, in one embodiment, the following steps are included:

S101c: the server acquires current location information of a mobile terminal and calculates a distance between the current location of the mobile terminal and a designated geo-fence.

In one embodiment, Step S101c includes the server querying a geo-fence closest to the current location of the mobile terminal and calculating the distance between the mobile terminal and the closest geo-fence according to a corresponding relation between predefined geographical location information and a geo-fence; or the server querying a closest geo-fence within a query region corresponding to the current location of the mobile terminal and calculating the distance between the mobile terminal and the closest geo-fence within the query region according to the corresponding relation between the predefined geographical location information and a geo-fence.

S102c: the server determines time interval information on a next positioning of the mobile terminal according to the distance.

S103c: the server sends the determined time interval information on the next positioning to the mobile terminal.

Figure 6:
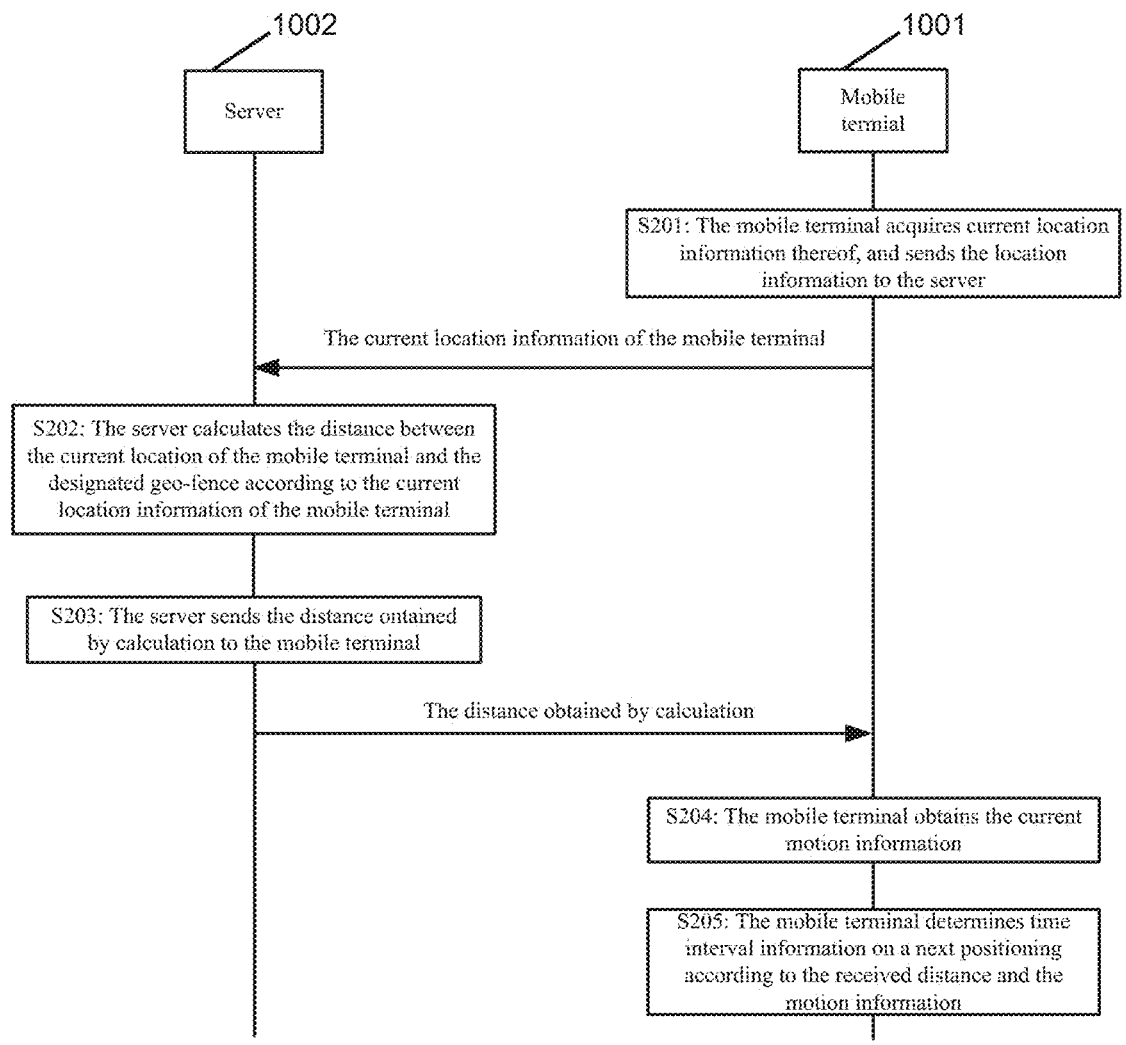
FIG. 6 is a flowchart of a method for determining a positioning interval of a mobile terminal according to an embodiment of the present disclosure.

FIG. 6 is an embodiment of the method for determining a positioning interval of a mobile terminal 1001 provided by the present disclosure. Specifically, in one embodiment, the following steps are included:

S201: the mobile terminal 1001 acquires current location information thereof, and sends the location information to server 1002;

S202: the server 1002 calculates the distance between the current location of the mobile terminal 1001 and a designated geo-fence according to the current location information of the mobile terminal 1001;

S203: the server 1002 sends the distance obtained by calculation to the mobile terminal 1001;

S204: the mobile terminal 1001 obtains the current motion information.

The motion information of the mobile terminal 1001 includes the speed of motion of the mobile terminal 1001 and/or the direction of motion of the mobile terminal 1001.

Correspondingly, the mobile terminal 1001 may determine the speed of motion by means of, for example, a speed sensor, and determine the direction of motion by means of a direction sensor.

S205: the mobile terminal 1001 determines time interval information on a next positioning according to the received distance and the motion information.

In this step, the next positioning time interval determined by the mobile terminal 1001 is positively associated with the distance between the mobile terminal 1001 and the designated geo-fence.

In this step, to the current motion information of the mobile terminal 1001, an example is taken in which the acquired motion information includes the speed of motion and the direction of motion of the mobile terminal 1001. If the mobile terminal 1001 enters into the designated geo-fence along the current direction of motion, the direction of motion of the mobile terminal 1001 can be associated with the designated geo-fence; however, if the mobile terminal 1001 does not enter into the designated geo-fence along the current direction of motion, the direction of motion of the mobile terminal 1001 cannot be associated with the designated geo-fence.

In one embodiment, if the direction of motion of the mobile terminal 1001 is associated with the designated geo-fence, the faster the speed of motion of the mobile terminal 1001 is, the more possible the mobile terminal 1001 enters into the designated geo-fence in the future. However, if the direction of motion of the mobile terminal 1001 is not associated with the designated geo-fence, the faster the speed of motion of the mobile terminal 1001 is, the less likely the mobile terminal 1001 enters into the designated geo-fence in the future. Therefore, if the direction of motion of the mobile terminal 1001 is associated with the designated geo-fence, the next positioning time interval determined by the mobile terminal 1001 is inversely associated with the speed of motion of the mobile terminal 1001; however, if the direction of motion of the mobile terminal 1001 is not associated with the designated geo-fence, the next positioning time interval determined by the mobile terminal 1001 is positively associated with the speed of motion of the mobile terminal 1001.

In one embodiment, an example is taken in which the direction of motion of the mobile terminal 1001 is associated with the designated geo-fence. If the speed of motion of the mobile terminal 1001 is less than a preset speed value, such as if the user associated with the mobile terminal 1001 is likely motionless or walking, the mobile terminal 1001 less likely enters into the designated geo-fence in the future, and at the moment, the mobile terminal 1001 may configure a relatively larger increment for the next positioning time interval. If the speed of the mobile terminal 1001 is determined greater than or equal to the preset speed value, then the user associated with the mobile terminal 1001 is likely riding in a car and the mobile terminal 1001 more likely enters into the designated geo-fence in the future, and at the moment, the mobile terminal 1001 may configure a relatively smaller increment (the increment may be a negative value) for the next positioning time interval.

In one embodiment, after the mobile terminal 1001 determines the time interval information on the next positioning, a process of obtaining the location information and the motion information thereof may be correspondingly paused. After the determined time interval, the mobile terminal 1001 may reacquire the current location information and the motion information thereof, and the server 1002 may calculate a distance between the mobile terminal 1001 and a designated geo-fence according to the reacquired location information. In this way, the mobile terminal 1001 may determine the time interval information on the next positioning according to the distance obtained by recalculation and the reacquired motion information.

Figure 7:
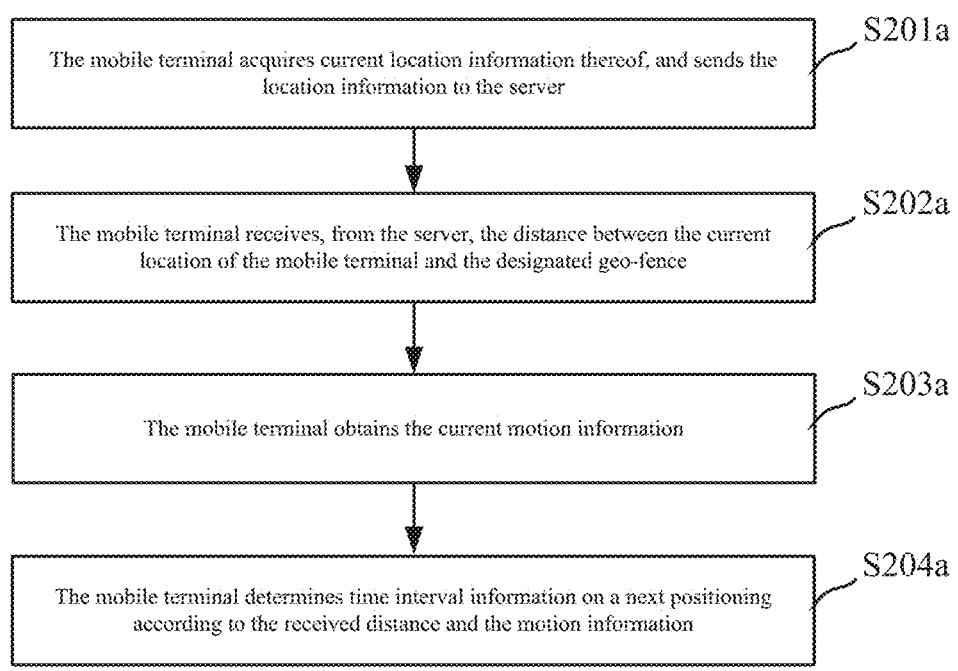
FIG. 7 is a flowchart of a method for determining a positioning interval of a mobile terminal, from the mobile terminal's perspective, according to an embodiment of the present disclosure.

FIG. 7 is an embodiment of the method for determining a positioning interval of a mobile terminal, from the mobile terminal's perspective, provided by the present disclosure. Specifically, in one embodiment the following steps are included: S201a: as stated above, the mobile terminal acquires current location information, and sends the location information to the server.

S202a: as stated above, the mobile terminal receives, from the server, a distance between the current location of the mobile terminal and a designated geo-fence.

In one embodiment, Step S202a includes the mobile terminal receiving, from the server, a distance between the mobile terminal and a geo-fence closest to the current location; or the mobile terminal receiving, from the server, the distance between the mobile terminal and the geo-fence closest to the current location within a query region corresponding to location information of the mobile terminal.

S203a: the mobile terminal obtains the current motion information.

In one embodiment, the motion information includes the speed of motion of the mobile terminal and/or the direction of motion of the mobile terminal.

S204a: the mobile terminal determines time interval information on a next positioning according to the received distance and the motion information.

In this step, the next positioning time interval determined by the mobile terminal is positively associated with the distance between the mobile terminal and the designated geo-fence.

In this step, when the direction of motion of the mobile terminal is associated with the target geo-fence, the next positioning time interval determined by the mobile terminal is, in one embodiment, inversely associated with the speed of motion of the mobile terminal.

Figure 8:
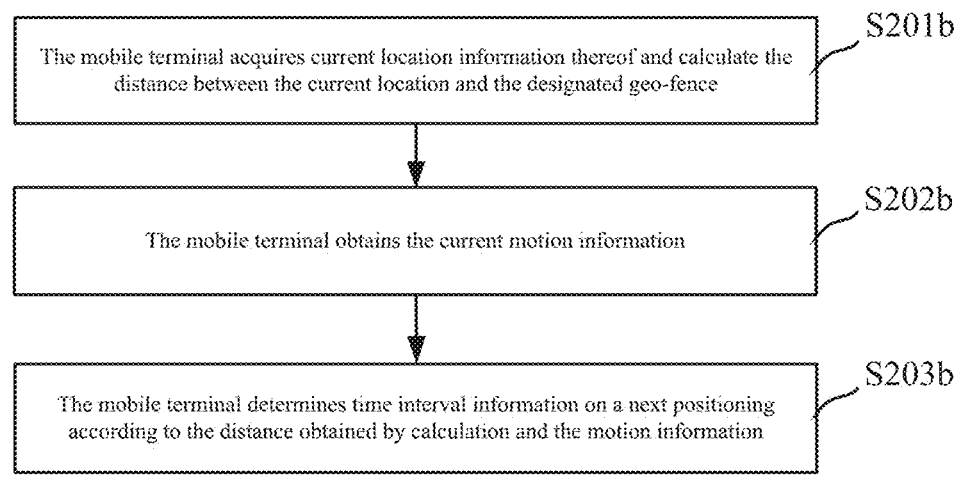
FIG. 8 is a flowchart of a method for determining a positioning interval of a mobile terminal, from the mobile terminal's perspective, according to another embodiment of the present disclosure.

FIG. 8 is an embodiment of the method for determining a positioning interval of a mobile terminal, from the mobile terminal's perspective, provided by the present application. Specifically the following steps are, in one embodiment, included:

S201b: the mobile terminal acquires current location information and calculates the distance between the current location and a designated geo-fence.

In one embodiment, Step S201b may include the mobile terminal querying a geo-fence closest to the current location of the mobile terminal and calculating the distance between the mobile terminal and the closest geo-fence according to a corresponding relation between predefined geographical location information and a geo-fence; or the mobile terminal queries a closest geo-fence within a query region corresponding to the current location of the mobile terminal and calculates the distance between the mobile terminal and the closest geo-fence within the query region according to the corresponding relation between the predefined geographical location information and a geo-fence.

S202b: the mobile terminal obtains the current motion information.

S203b: the mobile terminal determines time interval information on a next positioning according to the distance obtained by calculation and the motion information.

Figure 9:
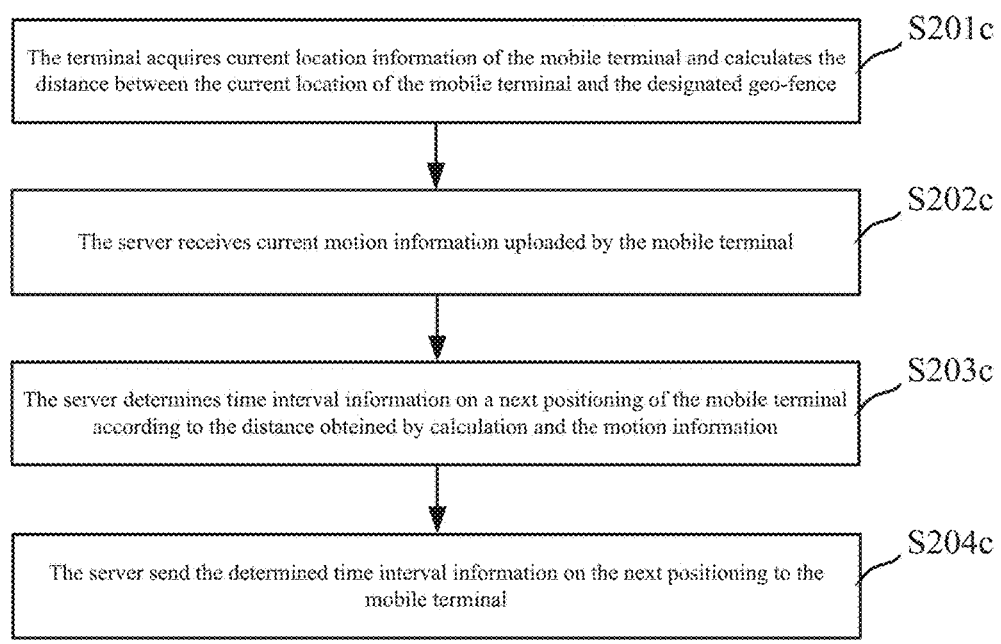
FIG. 9 is a flowchart of a method for determining a positioning interval of a mobile terminal, from the server's perspective, according to an embodiment of the present disclosure.

FIG. 9 is an embodiment of the method for determining a positioning interval of a mobile terminal, from the server's perspective, provided by the present disclosure. Specifically the following steps are, in one embodiment, included:

S201c: the server acquires current location information of the mobile terminal and calculates the distance between the current location of the mobile terminal and a designated geo-fence.

In one embodiment, Step S201c includes the server querying a geo-fence closest to the current location of the mobile terminal and calculating the distance between the mobile terminal and the closest geo-fence according to a corresponding relation between predefined geographical location information and a geo-fence; or the server querying a closest geo-fence within a query region corresponding to the current location of the mobile terminal and calculating the distance between the mobile terminal and the closest geo-fence within the query region according to the corresponding relation between the predefined geographical location information and a geo-fence.

S202c: the server receives current motion information uploaded by the mobile terminal.

S203c: the server determines time interval information on a next positioning of the mobile terminal according to the distance obtained by calculation and the motion information.

S204c: the server sends the determined time interval information on the next positioning to the mobile terminal.

In one embodiment, after the server determines the time interval information on the next positioning of the mobile terminal, a process of obtaining the location information and the motion information of the mobile terminal may be correspondingly paused. After the determined time interval, the server may reacquire the current location information and the motion information of the mobile terminal, and calculate the distance between the mobile terminal and a designated geo-fence according to the reacquired location information. In this way, the server may determine the time interval information on the next positioning of the mobile terminal according to the distance obtained by recalculation and the reacquired motion information.

Figure 10:
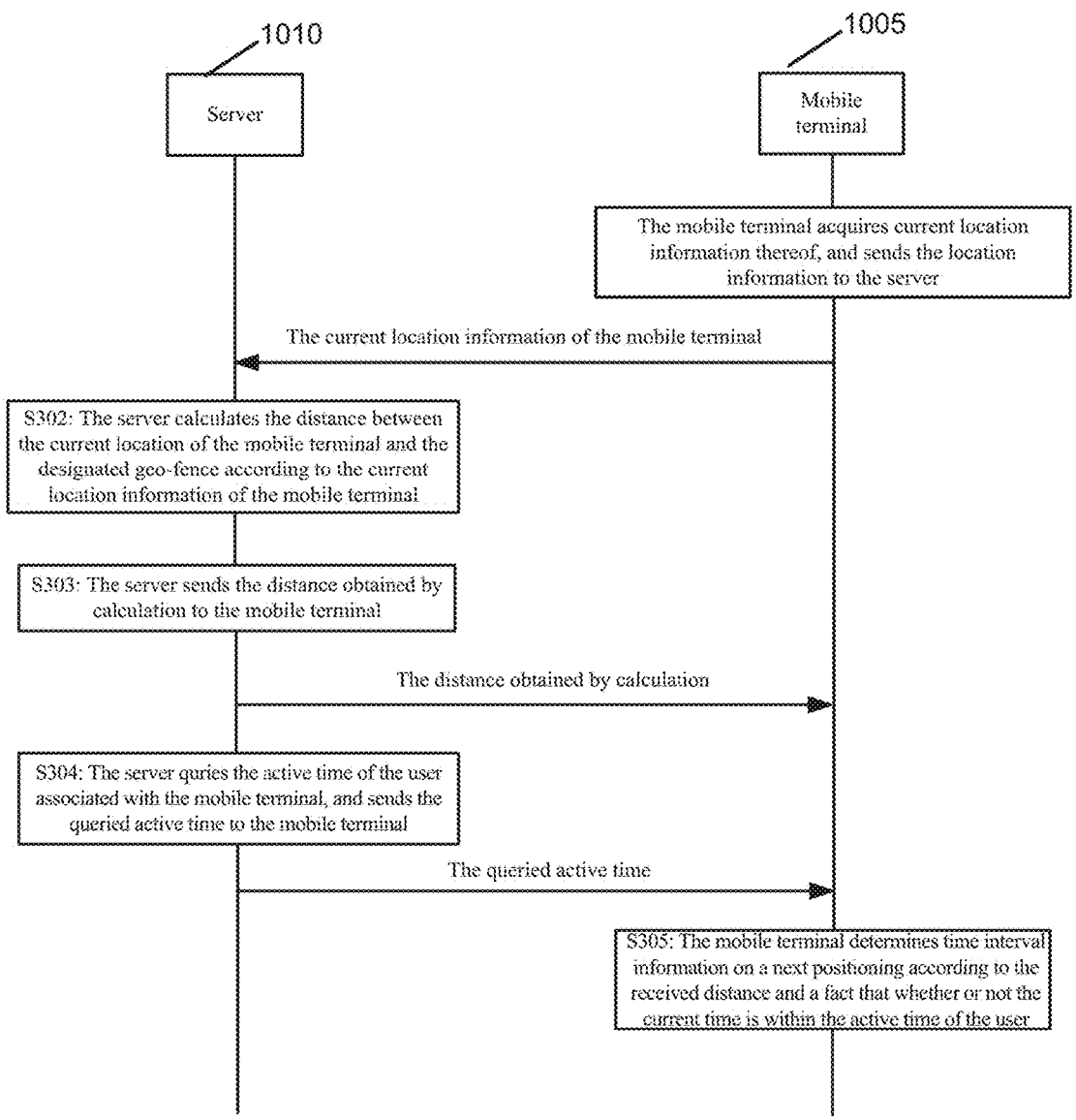
FIG. 10 is a flowchart of a method for determining a positioning interval of a mobile terminal according to an embodiment of the present disclosure.

FIG. 10 is an embodiment of the method for determining a positioning interval of a mobile terminal 1005 provided by the present disclosure. In one embodiment, the following steps are included:

S301: the mobile terminal 1005 acquires current location information, and sends the location information to server 1010.

S302: the server 1010 calculates the distance between the current location of the mobile terminal 1005 and a designated geo-fence according to the current location information of the mobile terminal 1005.

S303: the server 1010 sends the distance obtained by calculation to the mobile terminal 1005.

S304: the server 1010 queries active time of a user associated with the mobile terminal 1005, and sends the queried active time to the mobile terminal 1005.

By performing an analysis of a large amount of data associated with a behavior of the mobile terminal 1005, the server 1010 may determine occupational information of a user associated with the mobile terminal 1005, for example, an office worker, a freelancer or a student, etc. Corresponding active time may be analyzed according to different occupational information. For example, an office worker may be more active during business hours early in a workday, at lunchtime, after hours, and during weekends, and these time may be regarded as the active time of the user associated with the mobile terminal 1005.

S305: the mobile terminal 1005 determines time interval information on a next positioning according to the received distance and whether or not the current time is within the active time of the user.

In this step, the next positioning time interval determined by the mobile terminal is positively associated with the distance between the mobile terminal 1005 and the designated geo-fence.

In this step, the mobile terminal 1005 determines an active coefficient of likelihood according to whether or not the current time is within the active time of the user, where the active coefficient of likelihood indicates a possibility of the current user being in an active state, and the next positioning time interval determined by the mobile terminal is, in one embodiment, inversely associated with the active coefficient of likelihood.

If the current time is within the active time of the user, the mobile terminal 1005 sets the active coefficient of likelihood as a first value; if the current time is not within the active time of the user, the mobile terminal 1005 sets the active coefficient of likelihood as a second value, where the first value is, in one embodiment, greater than the second value.

In one embodiment, after the mobile terminal 1005 determines the time interval information on the next positioning, a process of obtaining the location information may be correspondingly paused. After the determined time interval, the mobile terminal 1005 may reacquire the current location information and the motion information thereof, and the server 1010 may calculate a distance between the mobile terminal 1005 and a designated geo-fence according to the reacquired location information. In this way, the mobile terminal 1005 may determine time interval information on a next positioning according to the distance obtained by recalculation and whether or not the new current time is within the active time of the user.

Although described as being performed by the mobile terminal, in another embodiment the server performs these steps.

Figure 11:
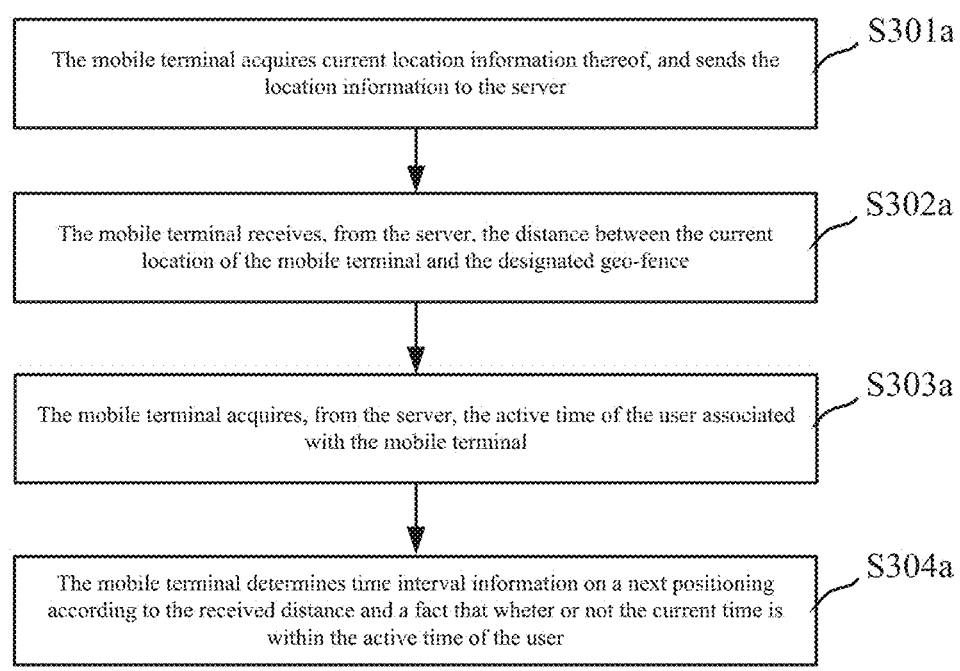
FIG. 11 is a flowchart of a method for determining a positioning interval of a mobile terminal, from the mobile terminal's perspective, according to an embodiment of the present disclosure.

FIG. 11 is an embodiment of a method for determining a positioning interval of a mobile terminal, from the mobile terminal's perspective, provided by the present disclosure. Specifically, the following steps are, in one embodiment, included:

S301a: as stated above, the mobile terminal acquires current location information thereof, and sends the location information to the server.

S302a: the mobile terminal receives, from the server, the distance between the current location of the mobile terminal and a designated geo-fence.

S303a: the mobile terminal acquires, from the server, active time of a user associated with the mobile terminal.

S304a: the mobile terminal determines time interval information on a next positioning according to the received distance and whether or not the current time is within the active time of the user.

Figure 12:
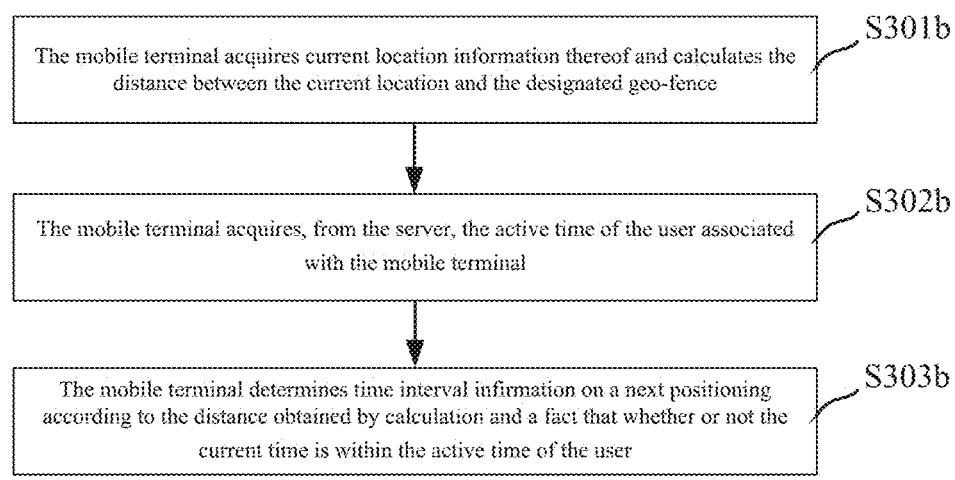
FIG. 12 is a flowchart of a method for determining a positioning interval of a mobile terminal, from the mobile terminal's perspective, according to another embodiment of the present disclosure.

FIG. 12 is an embodiment of a method for determining a positioning interval of a mobile terminal, from the mobile terminal's perspective, provided by the present disclosure. In one embodiment, the following steps are included:

S301b: the mobile terminal acquires current location information thereof and calculates the distance between the current location and a designated geo-fence.

Step S301b may include: the mobile terminal queries a geo-fence closest to the current location of the mobile terminal and calculates the distance between the mobile terminal and the closest geo-fence according to a corresponding relation between predefined geographical location information and a geo-fence; or the mobile terminal queries a closest geo-fence within a query region corresponding to the current location of the mobile terminal and calculates the distance between the mobile terminal and the closest geo-fence within the query region according to the corresponding relation between the predefined geographical location information and a geo-fence.

S302b: the mobile terminal acquires, from the server, active time of a user associated with the mobile terminal.

S303b: the mobile terminal determines time interval information on a next positioning according to the distance obtained by calculation and whether or not the current time is within the active time of the user.

In this step, the next positioning time interval determined by the mobile terminal is, in one embodiment, positively associated with the distance between the mobile terminal and the designated geo-fence.

In this step, the mobile terminal determines an active coefficient of likelihood according to, in one embodiment, whether or not the current time is within the active time of the user, where the active coefficient of likelihood indicates a possibility of the current user being in an active state, and the next positioning time interval determined by the mobile terminal is inversely associated with the active coefficient of likelihood.

If the current time is within the active time of the user, the mobile terminal sets the active coefficient of likelihood as a first value; if the current time is not within the active time of the user, the mobile terminal sets the active coefficient of likelihood as a second value, where the first value is, in one embodiment, greater than the second value.

In one embodiment, after the mobile terminal determines the time interval information on the next positioning, a process of obtaining the location information may be correspondingly paused. After the determined time interval, the mobile terminal may reacquire the current location information and the motion information, and calculate a distance between the mobile terminal and a designated geo-fence according to the reacquired location information. In this way, the mobile terminal may determine time interval information on a next positioning according to the distance obtained by recalculation and whether or not the new current time is within the active time of the user.

Figure 13:
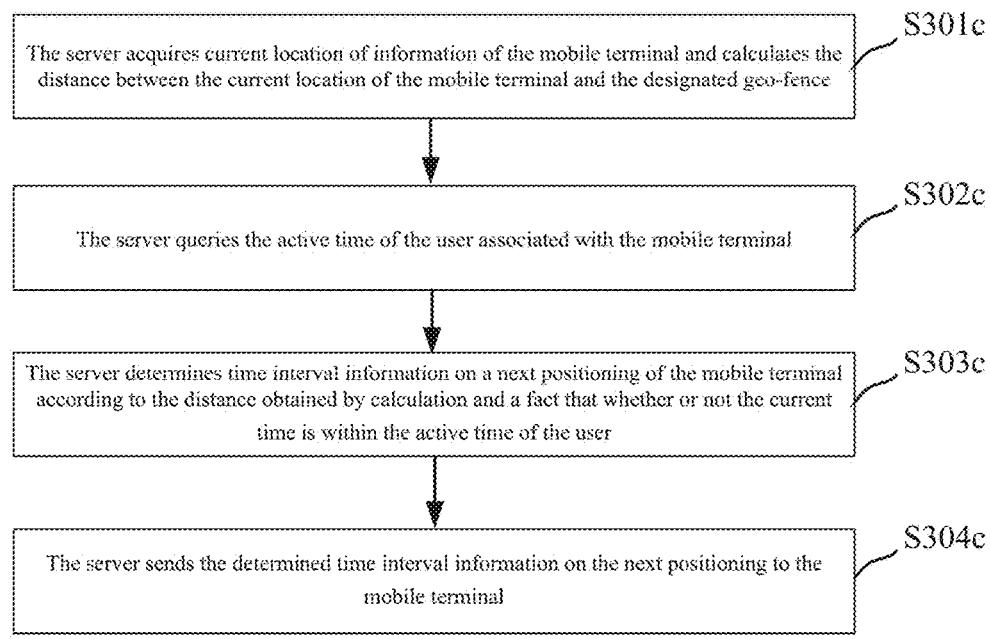
FIG. 13 is a flowchart of a method for determining a positioning interval of a mobile terminal, from the server's perspective, according to an embodiment of the present disclosure.

FIG. 13 is an embodiment of the method for determining a positioning interval of a mobile terminal, from the server's perspective, provided by the present disclosure. In one embodiment, the following steps are included:

S301c: as stated above, the server acquires current location information of the mobile terminal and calculates the distance between the current location of the mobile terminal and a designated geo-fence.

S302c: the server queries the active time of the user associated with the mobile terminal.

S303c: the server determines time interval information on a next positioning of the mobile terminal according to the distance obtained by calculation and whether or not the current time is within the active time of the user.

S304c: the server sends the determined time interval information on the next positioning to the mobile terminal.

In one embodiment, after the server determines the time interval information on the next positioning of the mobile terminal, a process of obtaining the location information of the mobile terminal may be correspondingly paused. After the determined time interval, the server may reacquire the current location information of the mobile terminal, and calculate a distance between the mobile terminal and a designated geo-fence according to the reacquired location information. In this way, the server may determine time interval information on a next positioning of the mobile terminal according to the distance obtained by recalculation and whether or not the new current time is within the active time of the user.

Figure 14:
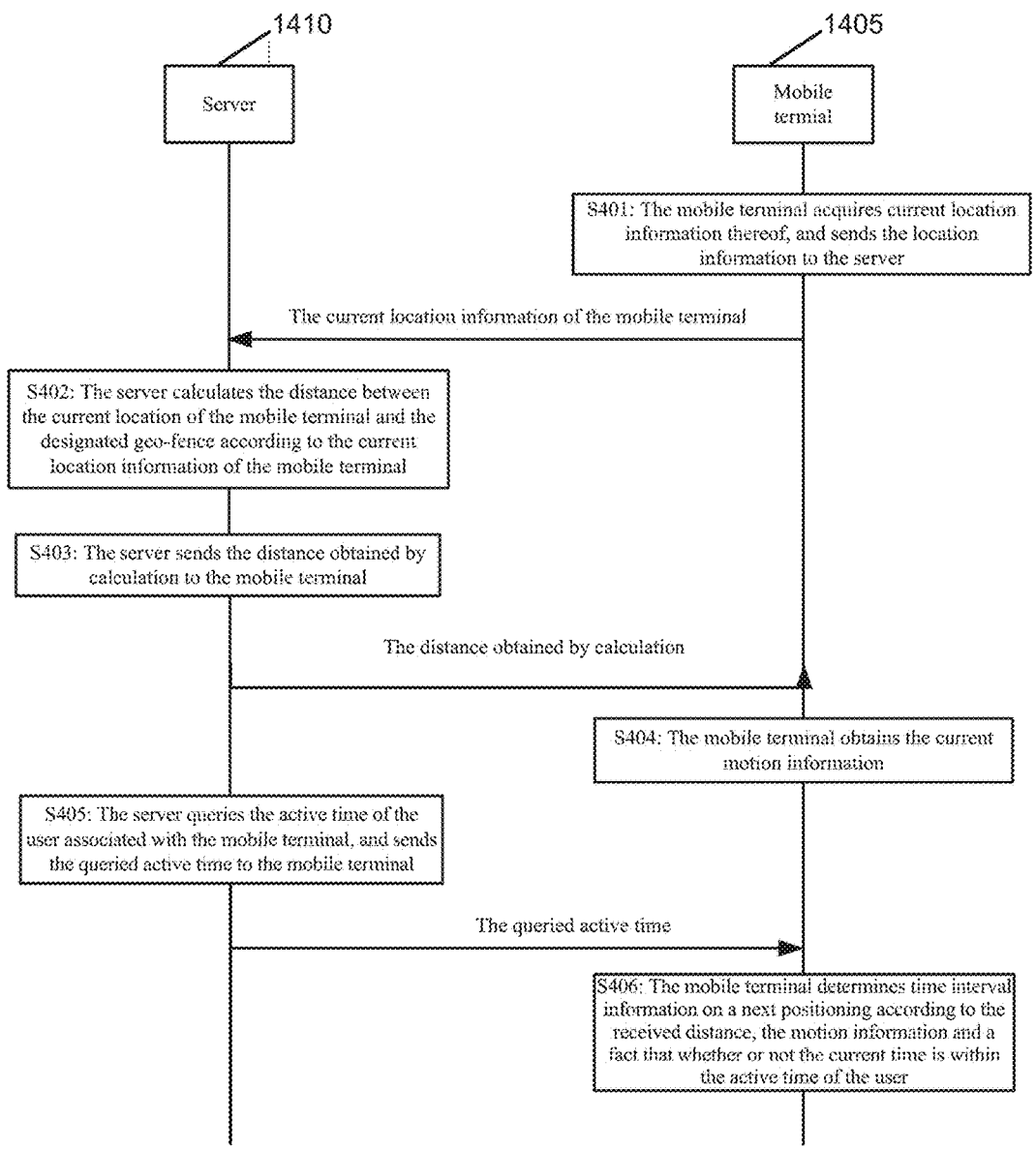
FIG. 14 is a flowchart of a method for determining a positioning interval of a mobile terminal according to an embodiment of the present disclosure.

FIG. 14 is an embodiment of a method for determining a positioning interval of a mobile terminal 1405 provided by the present disclosure. In one embodiment, the following steps are included:

S401: the mobile terminal 1405 acquires current location information thereof, and sends the location information to server 1410.

S402: the server 1410 calculates the distance between the current location of the mobile terminal 1405 and a designated geo-fence according to the current location information of the mobile terminal 1405.

S403: the server 1410 sends the distance obtained by calculation to the mobile terminal 1405.

S404: the mobile terminal 1405 obtains the current motion information.

S405: the server 1410 queries active time of a user associated with the mobile terminal 1405, and sends the queried active time to the mobile terminal 1405.

S406: the mobile terminal 1405 determines time interval information on a next positioning according to the received distance, the motion information and whether or not the current time is within the active time of the user.

In this step, the next positioning time interval determined by the mobile terminal 1405 is, in one embodiment, positively associated with the distance between the mobile terminal 1405 and the designated geo-fence.

The distance between the mobile terminal 1405 and the designated geo-fence may reflect, to a certain extent, the possibility of the mobile terminal 1405 entering into the geo-fence in the future. The closer the mobile terminal 1405 is to the designated geo-fence, the higher likelihood that the mobile terminal 1405 enters into the geo-fence. Therefore, the closer the mobile terminal 1405 is to the designated geo-fence, the smaller the time interval of a next positioning determined by the mobile terminal 1405 is. Correspondingly, the farther away the mobile terminal 1405 is to the designated geo-fence, the larger the time interval of the next positioning determined by the mobile terminal 1405 is.

In this step, to the current motion information of the mobile terminal 1405, an example is when the acquired motion information includes the speed of motion and the direction of motion of the mobile terminal 1405. If the mobile terminal 1405 may enter into the designated geo-fence along the current direction of motion, the direction of motion of the mobile terminal 1405 may be associated with the designated geo-fence; however, if the mobile terminal 1405 may not enter into the designated geo-fence along the current direction of motion, the direction of motion of the mobile terminal 1405 may not be associated with the designated geo-fence.

In one embodiment, after the mobile terminal 1405 determines the time interval information on the next positioning, a process of obtaining the location information and the motion information may be correspondingly paused. After the determined time interval, the mobile terminal 1405 may reacquire the current location information and the motion information thereof, and the server 1410 may calculate a distance between the mobile terminal 1405 and a designated geo-fence according to the reacquired location information. In this way, the mobile terminal 1405 may determine time interval information on a next positioning according to the distance obtained by recalculation, the reacquired motion information and whether or not the new current time is within the active time of the user.

Figure 15:
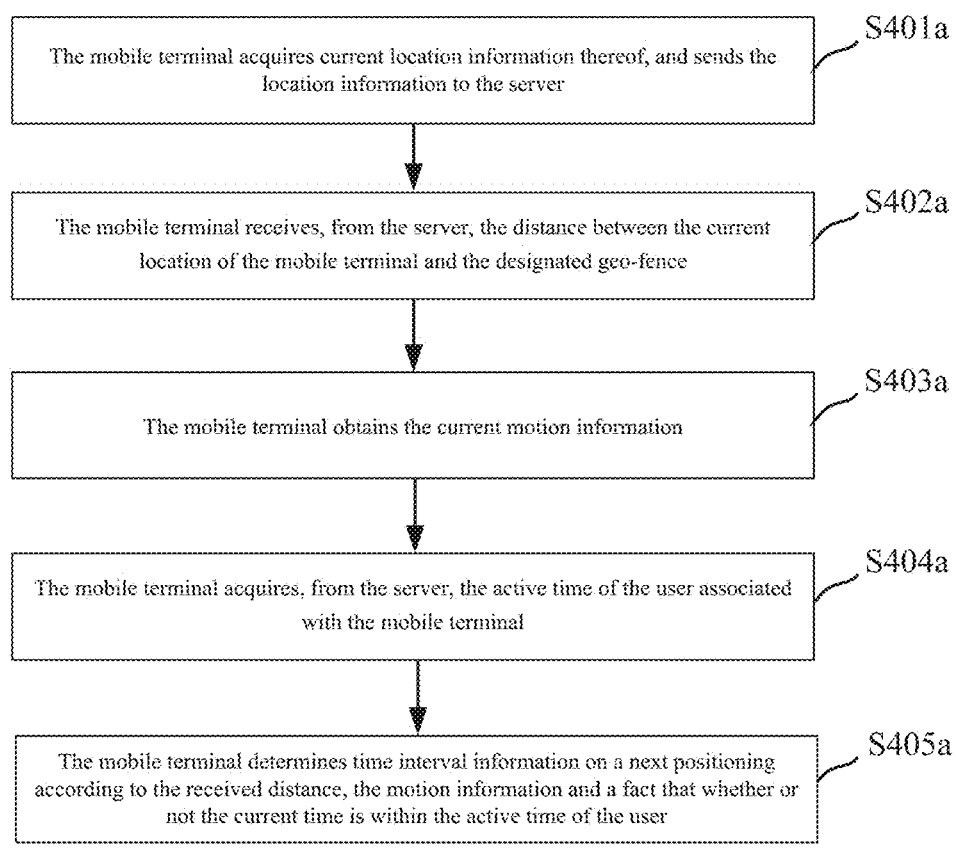
FIG. 15 is a flowchart of a method for determining a positioning interval of a mobile terminal, from the mobile terminal's perspective, according to an embodiment of the present disclosure.

FIG. 15 is an embodiment of a method for determining a positioning interval of a mobile terminal, from the mobile terminal's perspective, provided by the present disclosure. In one embodiment, the following steps are included:

S401a: the mobile terminal acquires current location information thereof, and sends the location information to the server.

S402a: the mobile terminal receives, from the server, the distance between the current location of the mobile terminal and a designated geo-fence.

In one embodiment, Step S402a includes the mobile terminal receiving, from the server, a distance between the mobile terminal and a geo-fence closest to the current location; or the mobile terminal receiving, from the server, the distance between the mobile terminal and the geo-fence closest to the current location within a query region corresponding to location information of the mobile terminal.

S403a: the mobile terminal obtains the current motion information.

The motion information includes: the speed of motion of the mobile terminal and/or the direction of motion of the mobile terminal.

S404a: the mobile terminal acquires, from the server, an active time of a user associated with the mobile terminal.

S405a: the mobile terminal determines time interval information on a next positioning according to the received distance, the motion information and whether or not the current time is within the active time of the user.

In this step, the mobile terminal determines an active coefficient of likelihood according to whether or not the current time is within the active time of the user, where the active coefficient of likelihood indicates a possibility of the current user being in an active state, and the next positioning time interval determined by the mobile terminal is, in one embodiment, inversely associated with the active coefficient of likelihood.

If the current time is within the active time of the user, the mobile terminal sets the active coefficient of likelihood as a first value; if the current time is not within the active time of the user, the mobile terminal sets the active coefficient of likelihood as a second value, where the first value is, in one embodiment, greater than the second value.

Figure 16:
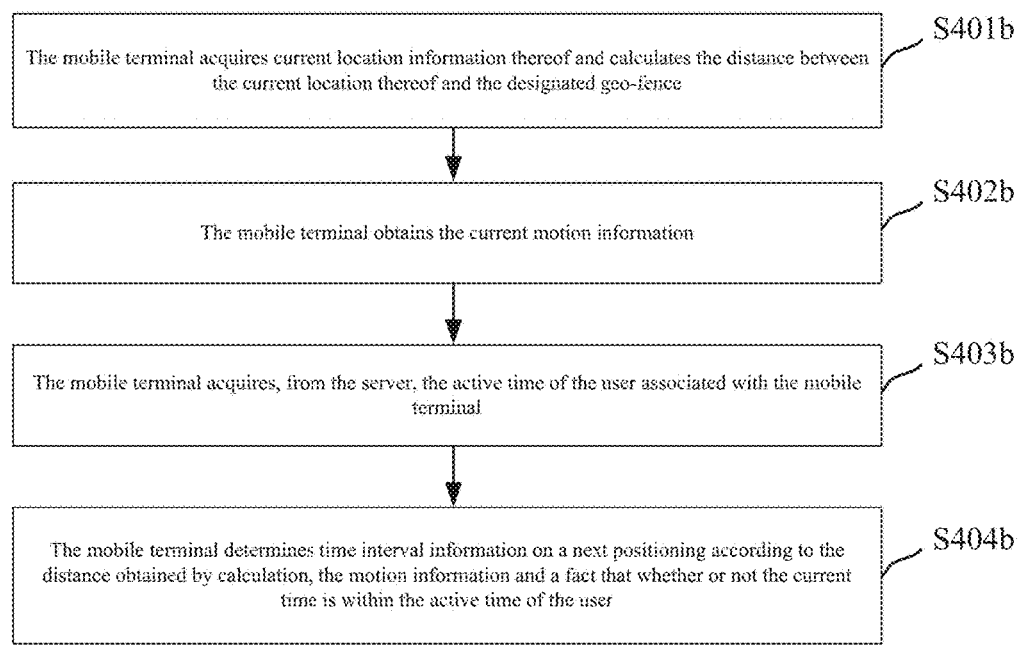
FIG. 16 is a flowchart of a method for determining a positioning interval of a mobile terminal, from the mobile terminal's perspective, according to another embodiment of the present disclosure.

FIG. 16 is an embodiment of the method for determining a positioning interval of a mobile terminal, from the mobile terminal's perspective, provided by the present disclosure. Specifically the following steps are, in one embodiment, included:

S401b: the mobile terminal acquires current location information thereof and calculates the distance between the current location thereof and a designated geo-fence.

In one embodiment, Step S401b may include the mobile terminal querying a geo-fence closest to the current location of the mobile terminal and calculating the distance between the mobile terminal and the closest geo-fence according to a corresponding relation between predefined geographical location information and a geo-fence; or the mobile terminal querying a closest geo-fence within a query region corresponding to the current location of the mobile terminal and calculating the distance between the mobile terminal and the closest geo-fence within the query region according to the corresponding relation between the predefined geographical location information and a geo-fence.

S402b: in one embodiment, the mobile terminal obtains the current motion information.

The motion information can include: the speed of motion of the mobile terminal and/or the direction of motion of the mobile terminal.

S403b: the mobile terminal acquires, from the server, active time of a user associated with the mobile terminal.

S404b: the mobile terminal determines, in one embodiment, time interval information on a next positioning according to the distance obtained by calculation, the motion information and whether or not the current time is within the active time of the user.

In this step, the next positioning time interval determined by the mobile terminal is, in one embodiment, positively associated with the distance between the mobile terminal and the designated geo-fence.

In this step, when the direction of motion of the mobile terminal is associated with the target geo-fence, the next positioning time interval determined by the mobile terminal is, in one embodiment, inversely associated with the speed of motion of the mobile terminal.

In this step, the mobile terminal determines, in one embodiment, an active coefficient of likelihood according to whether or not the current time is within the active time of the user, where the active coefficient of likelihood indicates, in one embodiment, a possibility of the current user being in an active state, and the next positioning time interval determined by the mobile terminal is, in one embodiment, inversely associated with the active coefficient of likelihood.

If the current time is within the active time of the user, the mobile terminal sets the active coefficient of likelihood as a first value; if the current time is not within the active time of the user, the mobile terminal sets the active coefficient of likelihood as a second value, where the first value is, in one embodiment, greater than the second value.

In one embodiment, after the mobile terminal determines the time interval information on the next positioning, a process of obtaining the location information and the motion information thereof may be correspondingly paused. After the determined time interval, the mobile terminal may reacquire the current location information and the motion information thereof, and calculate a distance between the mobile terminal and a designated geo-fence according to the reacquired location information. In this way, the mobile terminal may determine time interval information on a next positioning according to the distance obtained by recalculation, the reacquired motion information and whether or not the new current time is within the active time of the user.

Figure 17:
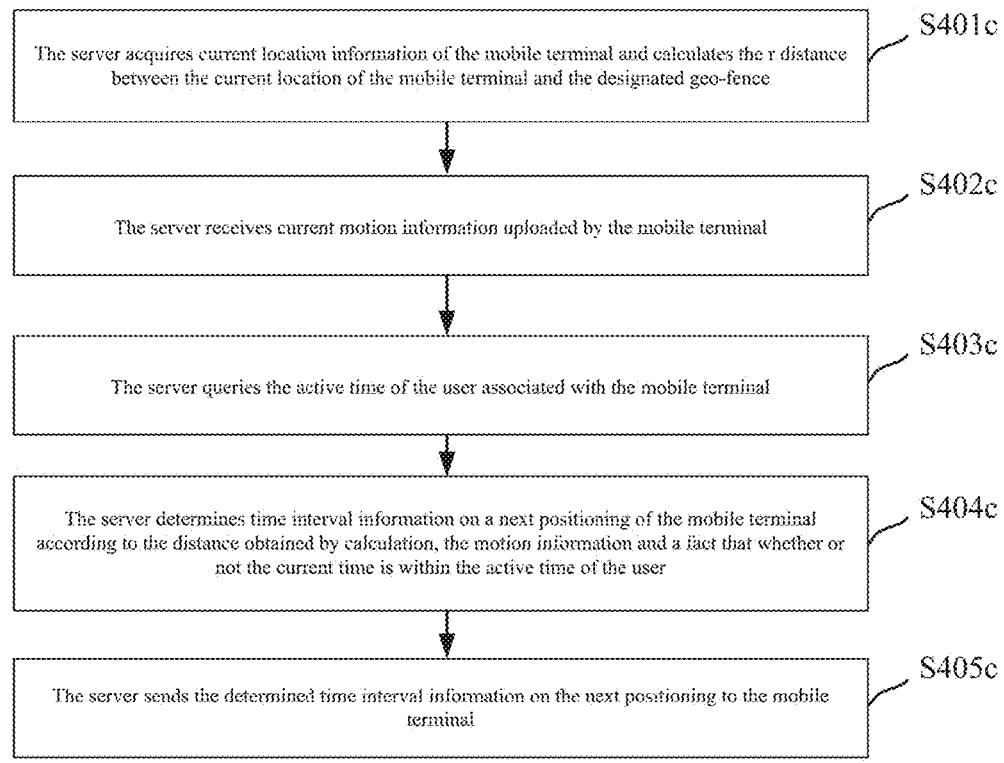
FIG. 17 is a flowchart of a method for determining a positioning interval of a mobile terminal, from the server's perspective, according to an embodiment of the present disclosure.

FIG. 17 is an embodiment of the method for determining a positioning interval of a mobile terminal, from the server's perspective, provided by the disclosure. In one embodiment, the following steps are included:

S401c: the server acquires current location information of the mobile terminal and calculates the distance between the current location of the mobile terminal and a designated geo-fence.

Step S401c may include:

The server queries a geo-fence closest to the current location of the mobile terminal and calculates the distance between the mobile terminal and the closest geo-fence according to a corresponding relation between predefined geographical location information and a geo-fence; or the server queries a closest geo-fence within a query region corresponding to the current location of the mobile terminal and calculates the distance between the mobile terminal and the closest geo-fence within the query region according to the corresponding relation between the predefined geographical location information and a geo-fence.

S402c: in one embodiment, the server receives current motion information uploaded by the mobile terminal.

The motion information can include: the speed of motion of the mobile terminal and/or the direction of motion of the mobile terminal.

S403c: in one embodiment, the server queries an active time of a user associated with the mobile terminal.

S404c: in one embodiment, the server determines time interval information on a next positioning of the mobile terminal according to the distance obtained by calculation, the motion information and whether or not the current time is within the active time of the user.

In this step, the next positioning time interval of the mobile terminal determined by the server is positively associated with the distance between the mobile terminal and the designated geo-fence.

In this step, when the direction of motion of the mobile terminal is associated with the designated geo-fence, the next positioning time interval of the mobile terminal determined by the server is, in one embodiment, inversely associated with the speed of motion of the mobile terminal.

Although described above as the mobile terminal determining an active coefficient of likelihood, in another embodiment the server determines an active coefficient of likelihood according to whether or not the current time is within the active time of the user, where the active coefficient of likelihood indicates a possibility of the current user being in an active state, and the next positioning time interval determined by the server is inversely associated with the active coefficient of likelihood.

If the current time is within the active time of the user, the server sets the active coefficient of likelihood as a first value; if the current time is not within the active time of the user, the server sets the active coefficient of likelihood as a second value, where the first value is, in one embodiment, greater than the second value.

S405c: in one embodiment, the server sends the determined time interval information on the next positioning to the mobile terminal.

The following illustrates, by a specific example, the specific method for determining a positioning interval of a mobile terminal provided by the present application.

In an embodiment of a background process, the server converts, in advance, a geo-fence within a region to an eight-digit geohash code by using the geohash algorithm, and merges the converted eight-digit geohash codes, so that some adjacent parts of the geo-fence share one geohash code to reduce data pull quantity during subsequent querying of geo-fences.

The server may further generalize the converted eight-digit geohash code of the geo-fence into a five-digit geohash code, and establishes an inverted index of geo-fences queried from five-digit geohash codes.

In one embodiment, the mobile terminal acquires the current location information via positioning, converts the location information to an eight-digit geohash code by using the geohash algorithm, and sends the eight-digit geohash code to the server.

The server queries, according to the eight-digit geohash code sent by the mobile terminal, whether the mobile terminal currently can intersect a certain geo-fence, and executes, if so, service triggering of the corresponding geo-fence.

In one embodiment, the server simultaneously searches, according to the eight-digit geohash code sent by the mobile terminal, whether a geohash code around the eight-digit geohash code intersects a certain geo-fence within the query region, and regards, if so, the most adjacent geo-fence within the query region as the designated geo-fence. The distance between the mobile terminal and the designated geo-fence is calculated by means of the five-digit geohash code of the designated geo-fence and the geohash code converted from the location information of the mobile terminal, and the distance obtained by calculation is sent to the mobile terminal.

In one embodiment, simultaneously, the mobile terminal acquires the current speed of motion and direction of motion thereof, respectively, via the built-in speed sensor and the direction sensor, and queries, from the server, the active time of the user associated with the mobile terminal.

When the next positioning time interval is calculated, a component T1 of the next positioning time interval is determined according to, for example, the acquired distance; a component T2 of the next positioning time interval is determined according to the acquired motion information; and a component T3 of the next positioning time interval is determined according to whether the current time is within the active time of the user.

In one example, the formula for calculating the next positioning time interval T may be:

$T=T1+T2+T3$; or $T=\alpha*T1+\beta*T2+\gamma*T3$, where $\alpha$, $\beta$ and $\gamma$ are default weights.

Figure 18:
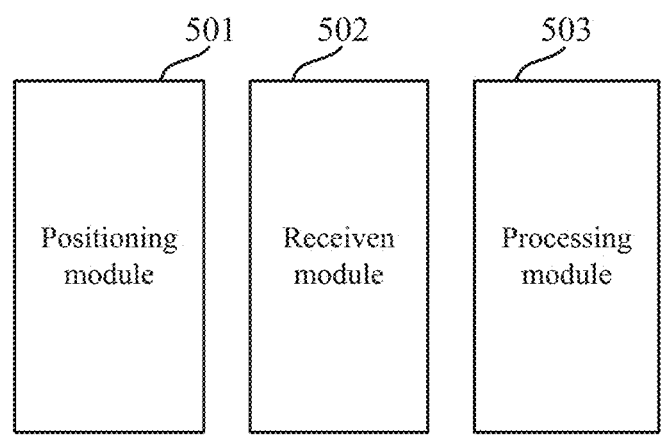
FIGS. 18-25 are schematic diagrams of modules of a mobile terminal for determining a positioning interval of a mobile terminal according to embodiments of the present disclosure.

Referring to FIG. 18, an embodiment introducing the mobile terminal for determining a positioning interval of a mobile terminal provided by the present disclosure is shown. In one embodiment, the mobile terminal includes:

a positioning module 501, configured to acquire current location information of a mobile terminal, and send the location information to a server;

a receiving module 502, configured to receive, from the server, a distance between the current location of the mobile terminal and a designated geo-fence; and a processing module 503, configured to determine time interval information on a next positioning according to the received distance.

In one embodiment, the receiving module 503 is configured to receive, from the server, the distance between the mobile terminal and a geo-fence closest to the current location; or receive, from the server, the distance between the mobile terminal and a geo-fence closest to the current location within a query region corresponding to location information of the mobile terminal.

In one embodiment, the next positioning time interval determined by the processing module 503 is, in one embodiment, positively associated with the distance.

Figure 19:
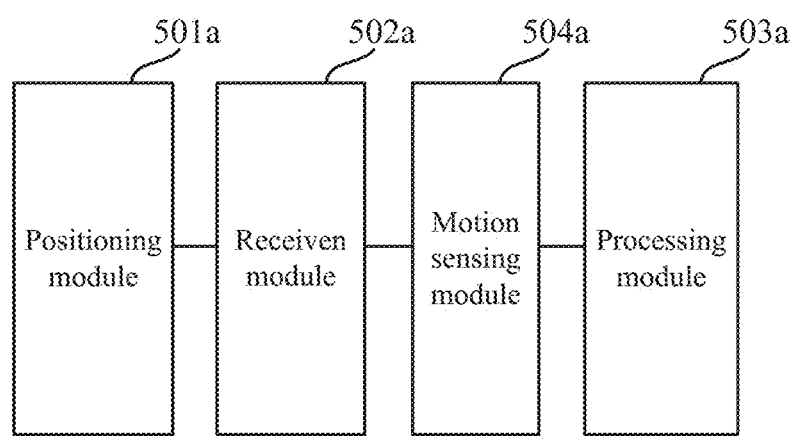

Referring to FIG. 19, an embodiment is disclosed introducing a mobile terminal for determining a positioning interval of a mobile terminal. In one embodiment, the mobile terminal includes:

a positioning module 501a, configured to acquire current location information of the mobile terminal, and send the location information to the server;

a receiving module 502a, configured to receive, from the server, the distance between the current location of the mobile terminal and a designated geo-fence;

a motion sensing module 504a, configured to obtain current motion information of the mobile terminal; and a processing module 503a, configured to determine time interval information on a next positioning according to the received distance and the motion information.

In one embodiment, the receiving module 502a is configured to receive, from the server, the distance between the mobile terminal and a geo-fence closest to the current location; or receive, from the server, the distance between the mobile terminal and a geo-fence closest to the current location within a query region corresponding to location information of the mobile terminal.

In one embodiment, the next positioning time interval determined by the processing module 503a is positively associated with the distance.

In one embodiment, the motion information includes: the speed of motion of the mobile terminal and/or the direction of motion of the mobile terminal, where when the direction of motion of the mobile terminal is associated with the target geo-fence, the next positioning time interval determined by the processing module 503a is inversely associated with the speed of motion of the mobile terminal.

Figure 20:
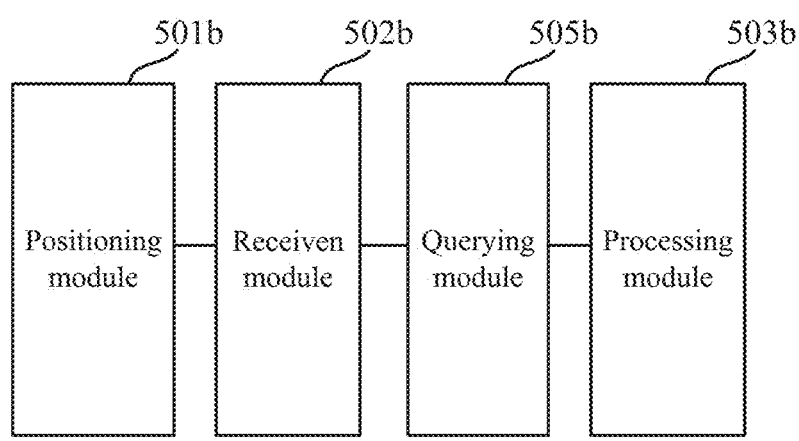

Referring to FIG. 20, an embodiment is disclosed introducing a mobile terminal for determining a positioning interval of a mobile terminal. In one embodiment, the mobile terminal includes a positioning module 501b, configured to acquire current location information of the mobile terminal, and send the location information to the server; a receiving module 502b, configured to receive, from the server, the distance between the current location of the mobile terminal and a designated geo-fence; a querying module 505b, configured to acquire, from the server, active time of a user associated with the mobile terminal; and a processing module 503b, configured to determine time interval information on a next positioning according to the received distance and whether or not the current time is within the active time of the user.

In one embodiment, the receiving module 502b is configured to receive, from the server, the distance between the mobile terminal and a geo-fence closest to the current location; or receive, from the server, the distance between the mobile terminal and a geo-fence closest to the current location within a query region corresponding to location information of the mobile terminal.

In one embodiment, the next positioning time interval determined by the processing module 503b is positively associated with the distance.

In one embodiment, the processing module 503b is further configured to determine an active coefficient of likelihood according to whether or not the current time is within the active time of the user, where the active coefficient of likelihood indicates a possibility of the current user being in an active state, and next positioning time interval determined by the processing module 503b is inversely associated with the active coefficient of likelihood; and if the current time is within the active time of the user, the processing module 503b sets the active coefficient of likelihood as a first value; if the current time is not within the active time of the user, the processing module 503b sets the active coefficient of likelihood as a second value; where the first value is, in one embodiment, greater than the second value.

Figure 21:
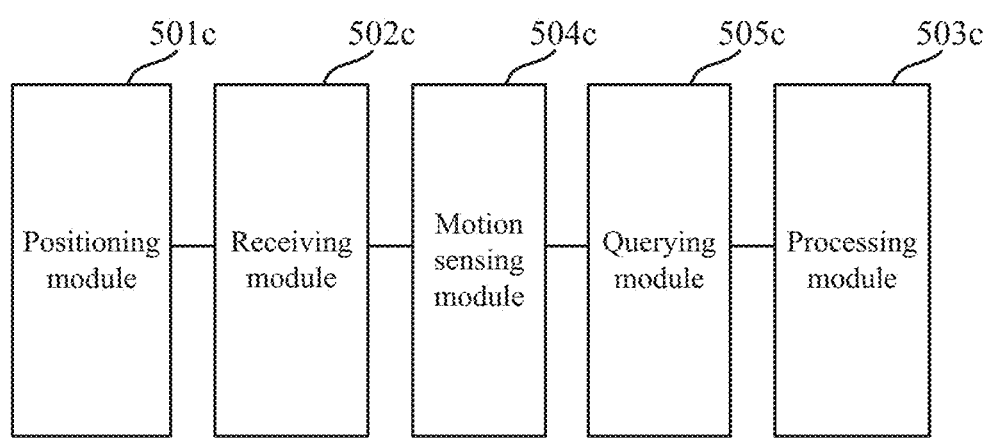

Referring to FIG. 21, an embodiment is disclosed introducing a mobile terminal for determining a positioning interval of a mobile terminal. In one embodiment, the mobile terminal includes a positioning module 501c, configured to acquire current location information of the mobile terminal, and send the location information to the server; a receiving module 502c, configured to receive, from the server, the distance between the current location of the mobile terminal and a designated geo-fence; a motion sensing module 504c, configured to obtain current motion information of the mobile terminal; a querying module 505c, configured to acquire, from the server, active time of a user associated with the mobile terminal; and a processing module 503c, configured to determine time interval information on a next positioning according to the received distance, the motion information and whether or not the current time is within the active time of the user.

In one embodiment, the receiving module 502c is configured to receive, from the server, the distance between the mobile terminal and a geo-fence closest to the current location; or receive, from the server, the distance between the mobile terminal and a geo-fence closest to the current location within a query region corresponding to location information of the mobile terminal.

In one embodiment, the next positioning time interval determined by the processing module 503c is positively associated with the distance.

In one embodiment, the motion information includes: the speed of motion of the mobile terminal and/or the direction of motion of the mobile terminal, where when the direction of motion of the mobile terminal is associated with the target geo-fence, the next positioning time interval determined by the processing module 503c is inversely associated with the speed of motion of the mobile terminal.

In one embodiment, the processing module 503c is further configured to determine an active coefficient of likelihood according to whether or not the current time is within the active time of the user, where the active coefficient of likelihood indicates a possibility of the current user being in an active state, and the next positioning time interval determined by the processing module is inversely associated with the active coefficient of likelihood; and if the current time is within the active time of the user, the processing module sets the active coefficient of likelihood as a first value; if the current time is not within the active time of the user, the processing module sets the active coefficient of likelihood as a second value; where the first value is, in one embodiment, greater than the second value.

Figure 22:
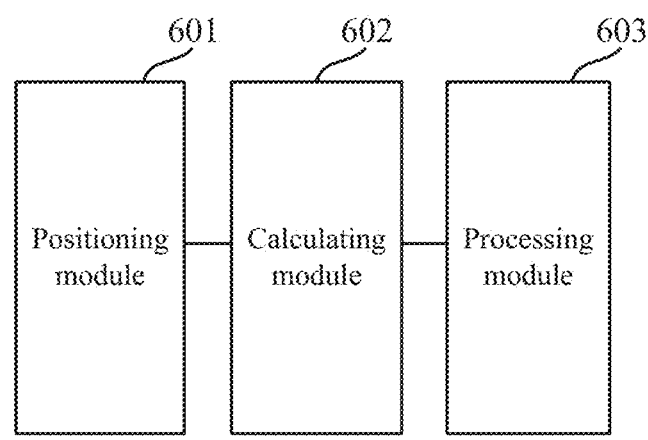

Referring to FIG. 22, an embodiment is disclosed introducing a mobile terminal for determining a positioning interval of a mobile terminal. In one embodiment, the mobile terminal includes a positioning module 601, configured to acquire current location information of the mobile terminal; a calculating module 602, configured to calculate the distance between the current location of the mobile terminal and a designated geo-fence; and a processing module 603, configured to determine time interval information on a next positioning according to the distance obtained by calculation.

In one embodiment, the calculating module 603 is configured to query a geo-fence closest to the current location of the mobile terminal and calculate the distance between the mobile terminal and the closest geo-fence according to a corresponding relation between predefined geographical location information and a geo-fence; or query the closest geo-fence within a query region corresponding to the current location of the mobile terminal and calculate the distance between the mobile terminal and the closest geo-fence within the query region according to the corresponding relation between the predefined geographical location information and a geo-fence.

In one embodiment, the next positioning time interval determined by the processing module 603 is positively associated with the distance.

Figure 23:
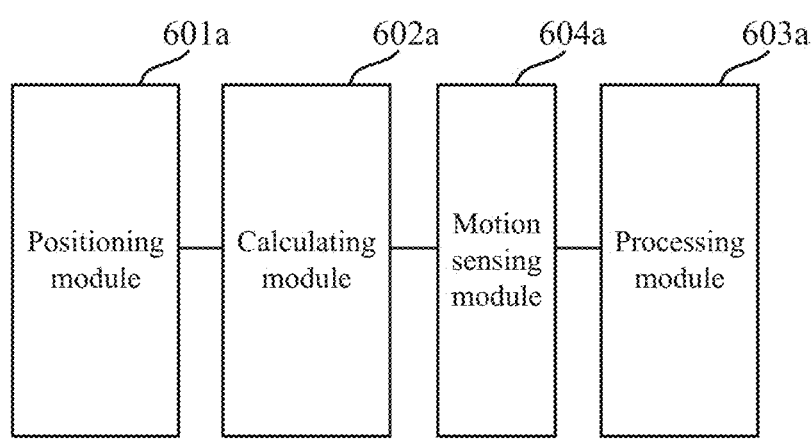

Referring to FIG. 23, an embodiment is disclosed introducing a mobile terminal for determining a positioning interval of a mobile terminal. In one embodiment, the mobile terminal includes a positioning module 601a, configured to acquire current location information of the mobile terminal; a calculating module 602a, configured to calculate the distance between the current location of the mobile terminal and a designated geo-fence; a motion sensing module 604a, configured to obtain current motion information of the mobile terminal; and a processing module 603a, configured to determine time interval information on a next positioning according to the distance obtained by calculation and the motion information.

In one embodiment, the calculating module 602a is configured to query a geo-fence closest to the current location of the mobile terminal and calculate the distance between the mobile terminal and the closest geo-fence according to a corresponding relation between predefined geographical location information and a geo-fence; or query the closest geo-fence within a query region corresponding to the current location of the mobile terminal and calculate the distance between the mobile terminal and the closest geo-fence within the query region according to the corresponding relation between the predefined geographical location information and a geo-fence.

In one embodiment, the next positioning time interval determined by the processing module 603a is positively associated with the distance.

In one embodiment, the motion information includes: the speed of motion of the mobile terminal and/or the direction of motion of the mobile terminal, where when the direction of motion of the mobile terminal is associated with the target geo-fence, the next positioning time interval determined by the processing module 603a is inversely associated with the speed of motion of the mobile terminal.

Figure 24:
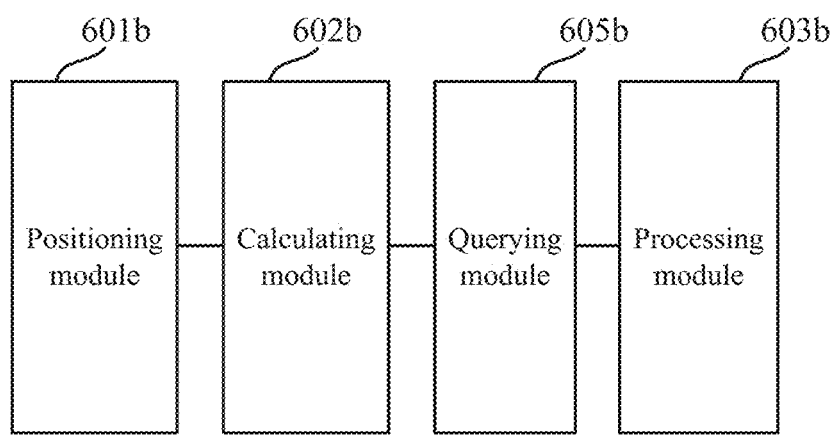

Referring to FIG. 24, an embodiment is disclosed introducing a mobile terminal for determining a positioning interval of a mobile terminal. In one embodiment, the mobile terminal includes a positioning module 601b, configured to acquire current location information of the mobile terminal; a calculating module 602b, configured to calculate the distance between the current location of the mobile terminal and a designated geo-fence; and a querying module 605b, configured to acquire, from the server, active time of a user associated with the mobile terminal; and a processing module 603b, configured to determine time interval information on a next positioning according to the distance obtained by calculation and whether or not the current time is within the active time of the user.

In one embodiment, the calculating module 602b is configured to query a geo-fence closest to the current location of the mobile terminal and calculate the distance between the mobile terminal and the closest geo-fence according to a corresponding relation between predefined geographical location information and a geo-fence; or query the closest geo-fence within a query region corresponding to the current location of the mobile terminal and calculate the distance between the mobile terminal and the closest geo-fence within the query region according to the corresponding relation between the predefined geographical location information and a geo-fence.

In one embodiment, the next positioning time interval determined by the processing module 603b is positively associated with the distance. In one embodiment, the processing module 603b is further configured to determine an active coefficient of likelihood according to whether or not the current time is within the active time of the user, where the active coefficient of likelihood indicates a possibility of the current user being in an active state, and the next positioning time interval determined by the processing module 603b is inversely associated with the active coefficient of likelihood; and if the current time is within the active time of the user, the processing module 603b sets the active coefficient of likelihood as a first value; if the current time is not within the active time of the user, the processing module 603b sets the active coefficient of likelihood as a second value; where the first value is, in one embodiment, greater than the second value.

Figure 25:
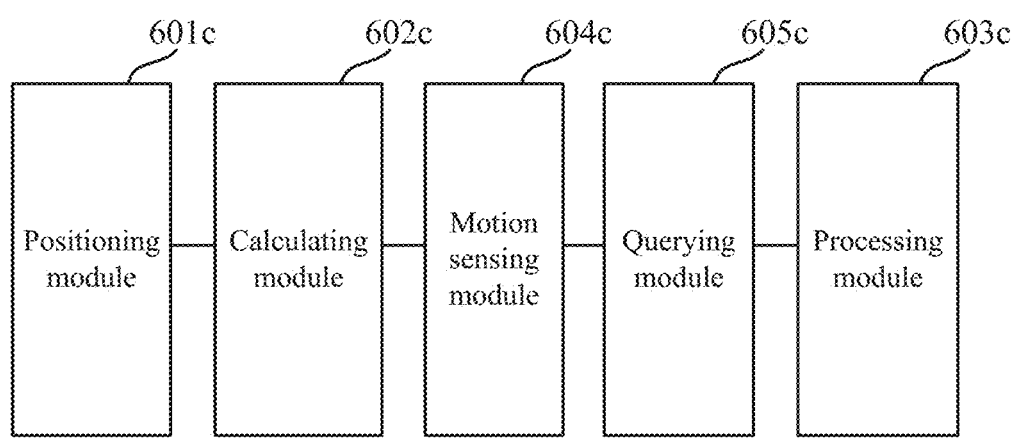

Referring to FIG. 25, an embodiment is disclosed introducing a mobile terminal for determining a positioning interval of a mobile terminal. In one embodiment, the mobile terminal includes a positioning module 601c, configured to acquire current location information of the mobile terminal; a calculating module 602c, configured to calculate the distance between the current location of the mobile terminal and a designated geo-fence; a motion sensing module 604c, configured to obtain current motion information of the mobile terminal; a querying module 605c, configured to acquire, from the server, active time of a user associated with the mobile terminal; and a processing module 603c, configured to determine time interval information on a next positioning according to the distance obtained by calculation, the motion information and whether or not current time is within the active time of the user.

In one embodiment, the calculating module 602c is configured to query a geo-fence closest to the current location of the mobile terminal and calculate the distance between the mobile terminal and the closest geo-fence according to a corresponding relation between predefined geographical location information and a geo-fence; or query the closest geo-fence within a query region corresponding to the current location of the mobile terminal and calculate the distance between the mobile terminal and the closest geo-fence within the query region according to the corresponding relation between the predefined geographical location information and a geo-fence.

In one embodiment, the next positioning time interval determined by the processing module 603c is positively associated with the distance.

In one embodiment, the motion information includes: the speed of motion of the mobile terminal and/or the direction of motion of the mobile terminal, where when the direction of motion of the mobile terminal is associated with the target geo-fence, the next positioning time interval determined by the processing module 603c is inversely associated with the speed of motion of the mobile terminal.

In one embodiment, the processing module 603c is further configured to determine an active coefficient of likelihood according to whether or not the current time is within the active time of the user, where the active coefficient of likelihood indicates a possibility of the current user being in an active state, and the next positioning time interval determined by the processing module 603c is inversely associated with the active coefficient of likelihood; and if the current time is within the active time of the user, the processing module 603c sets the active coefficient of likelihood as a first value; if the current time is not within the active time of the user, the processing module 603c sets the active coefficient of likelihood as a second value; where the first value is, in one embodiment, greater than the second value.

Figure 26:
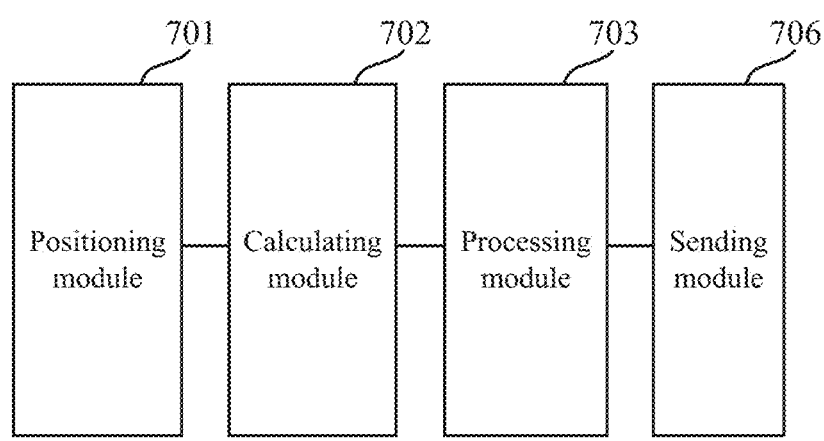
FIGS. 26-29 are schematic diagrams of modules of a server for determining a positioning interval of a mobile terminal according to embodiments of the present disclosure.

Referring to FIG. 26, an embodiment is disclosed introducing the server for determining a positioning interval of a mobile terminal. In one embodiment, the server includes a positioning module 701, configured to acquire current location information of the mobile terminal; a calculating module 702, configured to calculate the distance between the current location of the mobile terminal and a designated geo-fence; a processing module 703, configured to determine time interval information on a next positioning of the mobile terminal according to the distance obtained by calculation; and a sending module 706, configured to send the determined time interval information on a next positioning to the mobile terminal.

In one embodiment, the calculating module 702 is configured to query a geo-fence closest to the current location of the mobile terminal and calculate the distance between the mobile terminal and the closest geo-fence according to a corresponding relation between predefined geographical location information and a geo-fence; or query the closest geo-fence within a query region corresponding to the current location of the mobile terminal and calculate the distance between the mobile terminal and the closest geo-fence within the query region according to the corresponding relation between the predefined geographical location information and a geo-fence.

Figure 27:
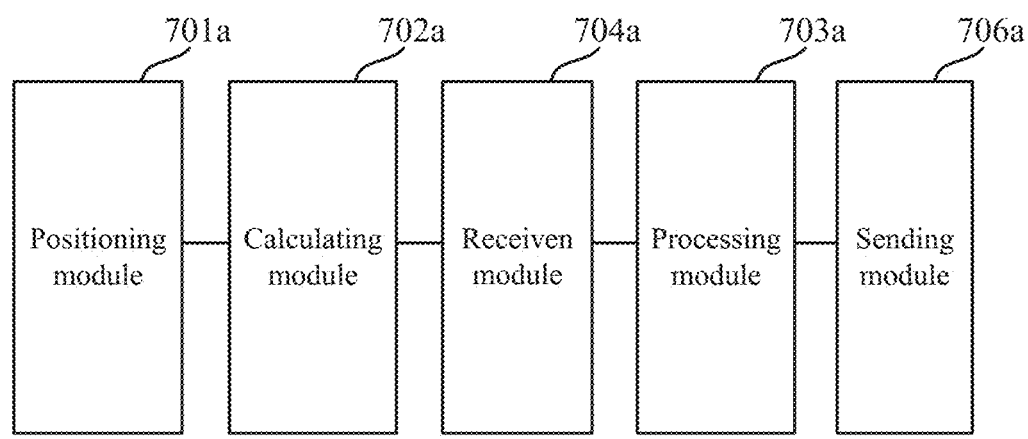

Referring to FIG. 27, an embodiment is disclosed introducing the server for determining a positioning interval of a mobile terminal. In one embodiment, the server includes a positioning module 701a, configured to acquire current location information of the mobile terminal; a calculating module 702a, configured to calculate the distance between the current location of the mobile terminal and a designated geo-fence; a receiving module 704a, configured to receive current motion information uploaded by the mobile terminal; a processing module 703a, configured to determine time interval information on a next positioning of the mobile terminal according to the distance obtained by calculation and the motion information; and a sending module 706a, configured to send the determined time interval information on a next positioning to the mobile terminal.

In one embodiment, the calculating module 702a is configured to query a geo-fence closest to the current location of the mobile terminal and calculate the distance between the mobile terminal and the closest geo-fence according to a corresponding relation between predefined geographical location information and a geo-fence; or query the closest geo-fence within a query region corresponding to the current location of the mobile terminal and calculate the distance between the mobile terminal and the closest geo-fence within the query region according to the corresponding relation between the predefined geographical location information and a geo-fence.

Figure 28:
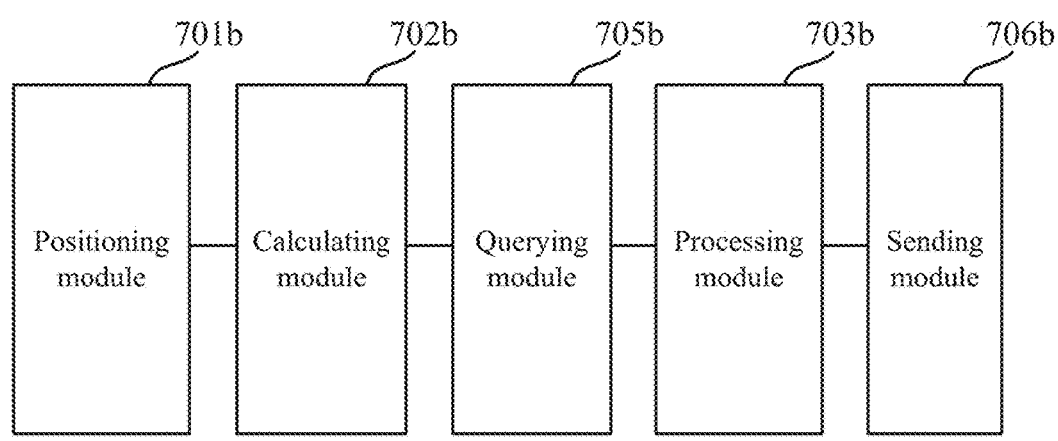

Referring to FIG. 28, an embodiment is disclosed introducing the server for determining a positioning interval of a mobile terminal. In one embodiment, the server includes a positioning module 701b, configured to acquire current location information of the mobile terminal; a calculating module 702b, configured to calculate the distance between the current location of the mobile terminal and a designated geo-fence; a querying module 705b, configured to query active time of a user associated with the mobile terminal; a processing module 703b, configured to determine time interval information on a next positioning of the mobile terminal according to the distance obtained by calculation and whether or not the current time is within the active time of the user; and a sending module 706b, configured to send the determined time interval information on a next positioning to the mobile terminal.

In one embodiment, the calculating module 702b is specifically configured to query a geo-fence closest to the current location of the mobile terminal or query the closest geo-fence within a query region as described above.

In one embodiment, the processing module 703b is further configured to determine the active coefficient of likelihood according to whether or not the current time is within the active time of the user, as described above.

Figure 29:
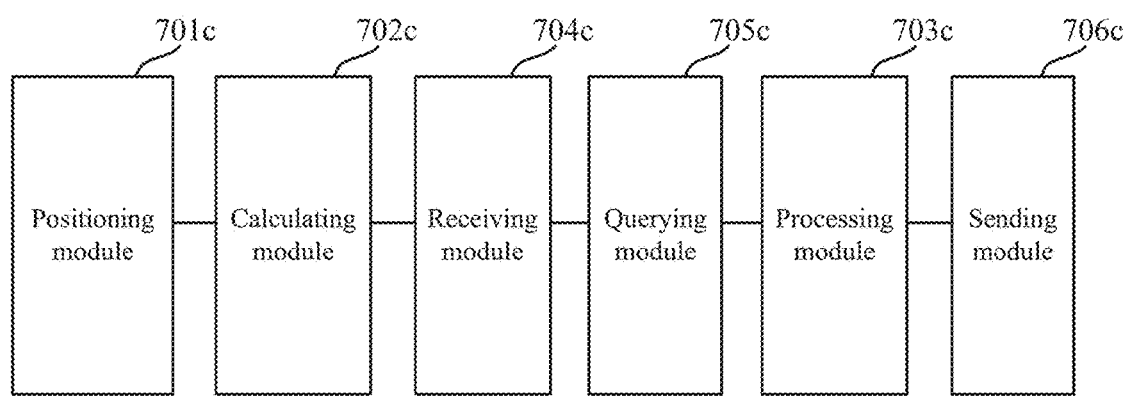

Referring to FIG. 29, an embodiment is disclosed introducing the server for determining a positioning interval of a mobile terminal. In one embodiment, the server includes a positioning module 701c, as described above; a calculating module 702c, as described above; a receiving module 704c, configured to receive current motion information uploaded by the mobile terminal; a querying module 705c, configured to query active time of a user associated with the mobile terminal; a processing module 703c, configured to determine time interval information on a next positioning of the mobile terminal according to the distance obtained by calculation, the motion information and a fact that whether or not current time is within the active time of the user; and a sending module 706c, configured to send the determined time interval information on a next positioning to the mobile terminal.

Embodiments of the present disclosure provide a system and method for determining a positioning interval of a mobile terminal. The method includes: acquiring location information of the mobile terminal, and sending the location information to the server, and then receiving, from the server, the distance between the current location of the mobile terminal and a designated geo-fence; obtaining current motion information of the mobile terminal, and acquiring, from the server, an active time of a user associated with the mobile terminal; and determining time interval information on a next positioning of the mobile terminal according to the received distance, the motion information and whether or not the current time is within the active time of the user. In this way, real-time adjustment of the positioning interval of the mobile terminal is implemented, power and network data flow consumed in mobile terminal positioning are reduced, and the recognition rate of geo-fencing is improved.

The present disclosure is described by reference to the method and system of embodiments of the present disclosure. It should be understood that each flow and/or block in the flowcharts and/or block diagrams and a combination thereof may be implemented by means of computer program instructions in combination with information sensing devices. These computer program instructions may be provided for a computer, a special-purpose computer, an embedded processor or processors of other programmable data processing equipment to generate a machine, so as to generate an apparatus configured to implement designated functions in one or more flows of a flowchart and/or one or more blocks of a block diagram by means of instructions executed by a computer or a processor of other programmable data processing terminal equipment.

These computer program instructions may also be stored in a computer-readable memory that can guide a computer or other programmable data processing equipment to work in a particular way, so that the instructions stored in the computer-readable memory generate a manufactured product including a command device that implements the designated functions in one or more flows of a flowchart and/or one or more blocks of a block diagram.

These computer program instructions may also be loaded on a computer or other programmable data processing equipment, to execute a series of operating steps on the computer or other programmable equipment to generate treatments implemented by the computer, so that instructions executed on the computer or other programmable equipment provide steps configured to implement designated functions in one or more flows of a flowchart and/or one or more blocks of a block diagram.

In a typical configuration, the computer equipment includes one or more CPUs, input-output interfaces, network interfaces and memories.

A memory may include a volatile memory in a computer-readable medium, a random access memory (RAM) and/or a non-volatile memory, such as a read-only memory (ROM) or a flash RAM. A memory is an example of a computer-readable storage medium.

A computer-readable storage medium includes a non-volatile medium, a volatile medium, a mobile medium or an immobile medium, which may implement information storage by means of any method or technology. Information may be a computer-readable instruction, a data structure, a module of a program, or other data. Examples of computer storage media include but are not limited to: a phase change random access memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc-read only memory (CD-ROM), a digital versatile disc (DVD) or other optical memories, a cartridge magnetic tape, a magnetic tape or magnetic disk memory or other magnetic storage devices or any other non-transmission media, which may be configured to store information that can be accessed by a computing device. As defined herein, computer-readable storage media does not include transitory media, for example, modulated data signals and carriers.

Furthermore, terms such as "comprise", "include" or other variants thereof are intended to cover a non-exclusive "comprise" so that a process, a method, a merchandise or a device comprising a series of elements not only includes these elements, but also includes other elements not listed explicitly, or also includes inherent elements of the process, the method, the merchandise or the device. In the case of no more restrictions, elements restricted by a sentence "include a . . . " do not exclude the fact that additional identical elements may exist in a process, a method, a commodity or a device of these elements.

The embodiments described above are only illustrated as embodiments of the present application, and are not intended to limit the present application. To those skilled in the art, various modifications and variations may be available for the present application. All modifications, equivalent substitutions and improvements made within the spirit and principle of the present application shall fall within the protection scope of the claims of the present application.

What is claimed is:

1. A method for determining a positioning interval of a mobile terminal, comprising:
acquiring, by the mobile terminal, current location information, the current location information comprising a current location;
transmitting, by the mobile terminal, the current location information to a server;
receiving, by the mobile terminal from the server, a distance between the current location of the mobile terminal and a geo-fence closest to the current location within a query region corresponding to location information of the mobile terminal;

acquiring, by the mobile terminal from the server, an active time of a user associated with the mobile terminal, the active time representing a window of time in which the user has previously moved;

determining, by the mobile terminal, time interval information of a next positioning according to the received distance and whether a current time is within the active time of the user;

calculating, by the mobile terminal, an active coefficient of likelihood based on the active time and a current time, the active coefficient of likelihood representing the likelihood of the user being active at the current time; and modifying, by the mobile terminal, the time interval information based on the active coefficient of likelihood.

2. The method of claim 1, wherein a next positioning time interval determined by the mobile terminal is positively associated with the distance.

3. The method of claim 1, the modifying the time interval information based on the active coefficient of likelihood comprising inversely modifying the time interval information based on the active coefficient of likelihood.

4. The method of claim 1, further comprising:
obtaining, by the mobile terminal, current motion information; and
determining, by the mobile terminal, the time interval information on the next positioning according to the received distance, the motion information and whether the current time is within the active time of the user.

5. The method of claim 4, wherein the motion information comprises:
a speed of motion of the mobile terminal or a direction of motion of the mobile terminal; and
when the direction of motion of the mobile terminal is associated with the designated geo-fence, a next positioning time interval determined by the mobile terminal is inversely associated with the speed of motion of the mobile terminal.

6. A mobile terminal for determining a positioning interval of the mobile terminal, comprising:
a processor; and
a computer-readable memory storing computer-readable instructions therein that, when executed by the processor, cause the mobile terminal to:
acquire current location information of the mobile terminal, the current location information comprising a current location;
calculate a distance between the current location of the mobile terminal and a geo-fence closest to the current location within a query region corresponding to location information of the mobile terminal;
acquire an active time of a user associated with the mobile terminal, the active time representing a window of time in which the user has previously moved;
determine time interval information of a next positioning according to the distance obtained by the calculating and whether a current time is within the active time of the user;
calculate an active coefficient of likelihood based on the active time and a current time, the active coefficient of likelihood representing the likelihood of the user being active at the current time; and
modify the time interval information based on the active coefficient of likelihood.

7. The mobile terminal of claim 6, wherein a next positioning time interval determined by the mobile terminal is positively associated with the distance.

8. The mobile terminal of claim 6, the instructions further causing the mobile terminal to:
obtain current motion information; and
determine the time interval information on the next positioning according to the received distance and the motion information.

9. The mobile terminal of claim 8, wherein the motion information comprises:
a speed of motion of the mobile terminal and/or a direction of motion of the mobile terminal; and
when the direction of motion of the mobile terminal is associated with the designated geo-fence, a next positioning time interval determined by the mobile terminal is inversely associated with the speed of motion of the mobile terminal.

10. The mobile terminal of claim 6, the modifying the time interval information based on the active coefficient of likelihood comprising inversely modifying the time interval information based on the active coefficient of likelihood.

11. A server for determining a positioning interval of a mobile terminal, comprising:
a processor; and
a computer-readable memory storing computer-readable instructions therein that, when executed by the processor, cause the server to:
acquire current location information of a mobile terminal, the current location information comprising a current location;
calculate a distance between the current location of the mobile terminal and a geo-fence closest to the current location within a query region corresponding to location information of the mobile terminal;
determine an active time of a user associated with the mobile terminal, the active time representing a window of time in which the user has previously moved;
determine time interval information of a next positioning of the mobile terminal according to the distance obtained by the calculating module;
calculate an active coefficient of likelihood based on the active time and a current time, the active coefficient of likelihood representing the likelihood of the user being active at the current time;
modify the time interval information based on the active coefficient of likelihood; and
transmit the determined time interval information of a next positioning to the mobile terminal.

12. The server of claim 11, wherein a next positioning time interval determined by the mobile terminal is positively associated with the distance.

13. The server of claim 11, the instructions further causing the server to:
obtain current motion information; and
determine the time interval information on the next positioning according to the received distance and the motion information.

14. The server of claim 12, wherein the motion information comprises:
a speed of motion of the mobile terminal and/or a direction of motion of the mobile terminal; and
when the direction of motion of the mobile terminal is associated with the designated geo-fence, a next positioning time interval determined by the mobile terminal is inversely associated with the speed of motion of the mobile terminal.

15. The server of claim 11, the modifying the time interval information based on the active coefficient of likelihood comprising inversely modifying the time interval information based on the active coefficient of likelihood.

\* \* \* \* \*